(12) United States Patent
Yang et al.

(10) Patent No.: US 10,142,174 B2
(45) Date of Patent: Nov. 27, 2018

(54) SERVICE DEPLOYMENT INFRASTRUCTURE REQUEST PROVISIONING

(71) Applicant: Oracle International Corporation, Redwood Shores, CA (US)

(72) Inventors: Hailun Yang, San Mateo, CA (US); Xiao Liu, San Francisco, CA (US); Ying Gao, San Jose, CA (US); Jeffrey Doering, Bend, OR (US); Yu Liu, Sammamish, WA (US); Raghuram Kudaravalli, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 221 days.

(21) Appl. No.: 15/246,352

(22) Filed: Aug. 24, 2016

(65) Prior Publication Data
US 2017/0063615 A1    Mar. 2, 2017

Related U.S. Application Data

(60) Provisional application No. 62/209,705, filed on Aug. 25, 2015.

(51) Int. Cl.
G06F 15/177    (2006.01)
H04L 12/24    (2006.01)
H04L 29/08    (2006.01)

(52) U.S. Cl.
CPC .......... *H04L 41/0806* (2013.01); *H04L 41/06* (2013.01); *H04L 41/5054* (2013.01); *H04L 67/16* (2013.01); *H04L 67/325* (2013.01)

(58) Field of Classification Search
None
See application file for complete search history.

(56) References Cited

U.S. PATENT DOCUMENTS

| 4,939,723 A | 7/1990 | Harley, Jr. et al. |
| 5,257,369 A | 10/1993 | Skeen et al. |

(Continued)

FOREIGN PATENT DOCUMENTS

| CN | 104604201 A | 5/2015 |
| CN | 104737517 A | 6/2015 |

(Continued)

OTHER PUBLICATIONS

U.S. Appl. No. 13/836,625, Non-Final Office Action dated Nov. 18, 2016, 41 pages.

(Continued)

*Primary Examiner* — Phyllis A Book
(74) *Attorney, Agent, or Firm* — Kilpatrick Townsend and Stockton LLP

(57) ABSTRACT

In certain embodiments, a Service Deployment Infrastructure (SDI) request engine is disclosed. The SDI request engine performs the tracking, management and provisioning of services subscribed to by customers of the cloud infrastructure system. The SDI request engine is deployed to process large volumes of provisioning requests and deliver time critical applications for customers. The SDI request engine translates each request into a list of tasks of various sizes based on the requirement and configuration of the request. In some embodiments, the SDI request engine imposes control and management on both request and task levels in order to execute, rollback, retry or fail a task automatically and accurately.

20 Claims, 20 Drawing Sheets

(56) References Cited

U.S. PATENT DOCUMENTS

| | | | |
|---|---|---|---|
| 5,418,782 A | 5/1995 | Wasilewski | |
| 6,052,684 A | 4/2000 | Du | |
| 6,144,647 A | 11/2000 | Lopez-Torres | |
| 6,151,601 A | 11/2000 | Papierniak et al. | |
| 6,222,832 B1 | 4/2001 | Proctor | |
| 6,334,193 B1 | 12/2001 | Buzsaki | |
| 6,496,831 B1 | 12/2002 | Baulier et al. | |
| 6,611,506 B1 | 8/2003 | Huang et al. | |
| 6,650,433 B1 | 11/2003 | Keane et al. | |
| 6,751,657 B1 | 6/2004 | Zothner | |
| 6,976,798 B2 | 12/2005 | Keane et al. | |
| 7,383,355 B1 | 6/2008 | Berkman et al. | |
| 7,698,398 B1 | 4/2010 | Lai | |
| 7,790,393 B2 | 9/2010 | Lyamichev et al. | |
| 8,165,152 B2 | 4/2012 | Sammour et al. | |
| 8,266,616 B1 | 9/2012 | Jacquot et al. | |
| 8,468,244 B2 | 6/2013 | Redlich et al. | |
| 8,666,935 B2 | 3/2014 | Evanitsky | |
| 8,856,077 B1 | 10/2014 | Samuelsson et al. | |
| 8,856,082 B2 | 10/2014 | Hale et al. | |
| 9,137,209 B1 | 4/2015 | Brandwine et al. | |
| 9,203,866 B2 | 12/2015 | Chatterjee et al. | |
| 9,219,749 B2 | 12/2015 | Khalsa et al. | |
| 9,336,030 B1 | 5/2016 | Marr et al. | |
| 9,336,483 B1 | 5/2016 | Abeysooriya et al. | |
| 9,467,355 B2 | 10/2016 | Doering et al. | |
| 9,501,541 B2 | 11/2016 | Doering et al. | |
| 9,535,754 B1* | 1/2017 | Suarez | G06F 9/5011 |
| 9,542,400 B2 | 1/2017 | Doering et al. | |
| 9,621,435 B2 | 4/2017 | Vasudevan et al. | |
| 9,646,069 B2 | 5/2017 | Khalsa et al. | |
| 9,838,370 B2 | 12/2017 | Doering et al. | |
| 2002/0004390 A1 | 1/2002 | Cutaia et al. | |
| 2002/0091863 A1 | 7/2002 | Schug | |
| 2002/0138582 A1 | 9/2002 | Chandra et al. | |
| 2004/0243941 A1 | 12/2004 | Fish | |
| 2005/0289072 A1 | 12/2005 | Sabharwal | |
| 2007/0005536 A1 | 1/2007 | Caswell et al. | |
| 2007/0028098 A1 | 2/2007 | Baartman et al. | |
| 2007/0266006 A1 | 11/2007 | Buss | |
| 2008/0155039 A1 | 6/2008 | Fernandes et al. | |
| 2008/0250074 A1 | 10/2008 | Parkinson | |
| 2009/0024522 A1 | 1/2009 | Reunert et al. | |
| 2009/0037492 A1 | 2/2009 | Baitalmal et al. | |
| 2009/0089407 A1 | 4/2009 | Chalupa et al. | |
| 2009/0106578 A1 | 4/2009 | Dilman et al. | |
| 2009/0198797 A1* | 8/2009 | Wang | H04L 41/0806 |
| | | | 709/220 |
| 2009/0217267 A1 | 8/2009 | Gebhart et al. | |
| 2009/0254572 A1 | 10/2009 | Redlich et al. | |
| 2009/0259683 A1 | 10/2009 | Murty | |
| 2009/0276771 A1 | 11/2009 | Nickolov et al. | |
| 2009/0293046 A1 | 11/2009 | Cheriton | |
| 2009/0300604 A1 | 12/2009 | Barringer | |
| 2010/0114618 A1 | 5/2010 | Wilcock et al. | |
| 2010/0191774 A1 | 7/2010 | Mason, Jr. et al. | |
| 2010/0248681 A1 | 9/2010 | Phills | |
| 2010/0251242 A1 | 9/2010 | Sivasubramanian et al. | |
| 2010/0269049 A1 | 10/2010 | Fearon | |
| 2010/0280892 A1 | 11/2010 | Uzunalioglu et al. | |
| 2010/0333116 A1 | 12/2010 | Prahlad et al. | |
| 2011/0004679 A1 | 1/2011 | Lo et al. | |
| 2011/0035444 A1 | 2/2011 | Hill | |
| 2011/0053555 A1 | 3/2011 | Cai et al. | |
| 2011/0112939 A1 | 5/2011 | Nelson et al. | |
| 2011/0131309 A1 | 6/2011 | Akiyama et al. | |
| 2011/0138047 A1 | 6/2011 | Brown et al. | |
| 2011/0138051 A1 | 6/2011 | Dawson et al. | |
| 2011/0138055 A1 | 6/2011 | Daly et al. | |
| 2011/0145199 A1 | 6/2011 | Prasad Palagummi | |
| 2011/0225461 A1 | 9/2011 | Wookey | |
| 2011/0288968 A1 | 11/2011 | King et al. | |
| 2011/0295998 A1 | 12/2011 | Ferris et al. | |
| 2011/0296000 A1 | 12/2011 | Ferris et al. | |
| 2011/0296018 A1 | 12/2011 | Deng et al. | |
| 2011/0307523 A1 | 12/2011 | Balani et al. | |
| 2011/0313902 A1 | 12/2011 | Liu et al. | |
| 2011/0314466 A1 | 12/2011 | Berg et al. | |
| 2011/0320605 A1 | 12/2011 | Kramer et al. | |
| 2012/0005341 A1 | 1/2012 | Seago et al. | |
| 2012/0032945 A1 | 2/2012 | Dare et al. | |
| 2012/0036220 A1 | 2/2012 | Dare et al. | |
| 2012/0036245 A1 | 2/2012 | Dare et al. | |
| 2012/0036440 A1 | 2/2012 | Dare et al. | |
| 2012/0036442 A1 | 2/2012 | Dare et al. | |
| 2012/0036552 A1 | 2/2012 | Dare et al. | |
| 2012/0041844 A1 | 2/2012 | Shen et al. | |
| 2012/0045854 A1 | 2/2012 | Matsuoka et al. | |
| 2012/0047357 A1 | 2/2012 | Bealkowski | |
| 2012/0054624 A1 | 3/2012 | Owens et al. | |
| 2012/0072555 A1 | 3/2012 | DeLuca et al. | |
| 2012/0079134 A1 | 3/2012 | Outhred et al. | |
| 2012/0084351 A1 | 4/2012 | Yato et al. | |
| 2012/0102160 A1 | 4/2012 | Breh et al. | |
| 2012/0131194 A1 | 5/2012 | Morgan | |
| 2012/0198073 A1 | 8/2012 | Srikanth et al. | |
| 2012/0221454 A1 | 8/2012 | Morgan | |
| 2012/0226796 A1 | 9/2012 | Morgan | |
| 2012/0226808 A1 | 9/2012 | Morgan | |
| 2012/0246248 A1 | 9/2012 | Arita | |
| 2012/0271949 A1 | 10/2012 | Radhakrishnan et al. | |
| 2012/0304191 A1 | 11/2012 | Morgan | |
| 2012/0311154 A1 | 12/2012 | Morgan | |
| 2012/0311657 A1 | 12/2012 | Boldyrev et al. | |
| 2012/0331050 A1 | 12/2012 | Wilbur et al. | |
| 2013/0007195 A1 | 1/2013 | Rinard et al. | |
| 2013/0007265 A1 | 1/2013 | Benedetti et al. | |
| 2013/0014107 A1 | 1/2013 | Kirchhofer | |
| 2013/0054763 A1 | 2/2013 | Van der Merwe et al. | |
| 2013/0055251 A1 | 2/2013 | Anderson et al. | |
| 2013/0080480 A1* | 3/2013 | Mao | H04L 41/5009 |
| | | | 707/803 |
| 2013/0110943 A1 | 5/2013 | Menon et al. | |
| 2013/0139152 A1 | 5/2013 | Chang et al. | |
| 2013/0204994 A1 | 8/2013 | Deshmukh et al. | |
| 2013/0212160 A1 | 8/2013 | Lawson et al. | |
| 2013/0227137 A1 | 8/2013 | Damola et al. | |
| 2013/0318241 A1 | 11/2013 | Acharya et al. | |
| 2014/0059226 A1 | 2/2014 | Messerli et al. | |
| 2014/0074539 A1 | 3/2014 | Doering et al. | |
| 2014/0074637 A1 | 3/2014 | Hammad | |
| 2014/0074793 A1 | 3/2014 | Doering et al. | |
| 2014/0074999 A1 | 3/2014 | Khalsa et al. | |
| 2014/0075016 A1 | 3/2014 | Chatterjee et al. | |
| 2014/0075031 A1 | 3/2014 | Doering et al. | |
| 2014/0075032 A1 | 3/2014 | Vasudevan et al. | |
| 2014/0075033 A1 | 3/2014 | Doering et al. | |
| 2014/0082749 A1 | 3/2014 | Holland et al. | |
| 2014/0141743 A1 | 5/2014 | Shaw | |
| 2014/0201345 A1 | 7/2014 | Abuelsaad et al. | |
| 2014/0237502 A1 | 8/2014 | Kelsen et al. | |
| 2014/0280800 A1 | 9/2014 | Verchere et al. | |
| 2015/0067171 A1 | 3/2015 | Yum et al. | |
| 2015/0074279 A1 | 3/2015 | Maes et al. | |
| 2015/0131674 A1 | 5/2015 | Kao et al. | |
| 2015/0227415 A1 | 8/2015 | Alves et al. | |
| 2015/0281316 A1* | 10/2015 | Bragstad | H04L 41/0806 |
| | | | 709/224 |
| 2015/0363724 A1 | 12/2015 | Chatterjee et al. | |
| 2015/0365301 A1 | 12/2015 | Chatterjee et al. | |
| 2016/0028581 A1 | 1/2016 | Khalsa et al. | |
| 2017/0063615 A1 | 3/2017 | Yang et al. | |
| 2017/0230235 A1 | 8/2017 | Khalsa et al. | |
| 2017/0244613 A1 | 8/2017 | Vasudevan | |

FOREIGN PATENT DOCUMENTS

| | | |
|---|---|---|
| CN | 104756460 A | 7/2015 |
| EP | 0538464 A1 | 4/1993 |
| EP | 2893683 A1 | 7/2015 |
| EP | 2893684 A1 | 7/2015 |
| EP | 2893685 A1 | 7/2015 |
| JP | 2012079210 | 4/2012 |
| JP | 2012084129 | 4/2012 |

(56) References Cited

FOREIGN PATENT DOCUMENTS

| JP | 2012511293 | | 5/2012 |
|---|---|---|---|
| JP | 2015529366 | A | 10/2015 |
| JP | 2015529367 | A | 10/2015 |
| JP | 2016-500854 | A | 1/2016 |
| WO | 2010151273 | A1 | 12/2010 |
| WO | 2012006638 | | 1/2012 |
| WO | 2012047932 | | 4/2012 |
| WO | 2012070993 | A1 | 5/2012 |
| WO | 2014039918 | A1 | 3/2014 |
| WO | 2014039919 | A1 | 3/2014 |
| WO | 2014039921 | A1 | 3/2014 |
| WO | 2015191119 | A1 | 12/2015 |

OTHER PUBLICATIONS

U.S. Appl. No. 13/907,616, Notice of Allowance dated Nov. 14, 2016, 10 pages.
International Application No. PCT/US2015/016214, International Preliminary Report on Patentability dated Sep. 19, 2016, 6 pages.
U.S. Appl. No. 13/836,625 Notice of Allowance, dated Jul. 6, 2017, 12 pages.
U.S. Appl. No. 15/445,617 Non-Final Office Action, dated Jul. 28, 2017, 15 pages.
U.S. Appl. No. 15/495,749 Non-Final Office Action, dated Sep. 25, 2017, 7 pages.
Chinese Application No. 201380046472.4, Office Action dated Feb. 20, 2017, 25 pages. (15 pages of English translation and 10 pages of Original document).
Chinese Application No. 201380054681.3, Office Action dated Nov. 16, 2017, 33 pages. (12 pages of English translation and 21 pages of original document).
Chinese Application No. 201380054825.5, Office Action dated Sep. 30, 2017, 9 pages. (6 pages of English translation and 3 pages of original document).
Japanese Patent Application JP2015-531268 Office Action, dated Sep. 26, 2017, 4 pages.
Japanese Application No. 2015-531269, Office Action dated Nov. 7, 2017, 5 pages. (1 page of English translation and 4 pages of original document).
Fukuda "Optimum Solution to Development of Smartphone App / Speedup with Basic Development Environment," Nikkei Business Publications, Inc., No. 814, Aug. 2, 2012, pp. 42-47.
"Customizing Deployment Procedures" Oracle® Enterprise Manager Lifecycle Management Administrator's Guide E27046-33, pp. 51-1 to 51-19 (Jun. 2015).
Afgan et al., CloudMan as a Tool Execution Framework for the Cloud, MIPRO, 2012 Proceedings of the 35th, International Convention, IEEE, XP032201952, ISBN: 978-1-4673-2577-6, May 21, 2012, pp. 437-441.
Bastos et al., Towards a Cloud-Based Environment for Space Systems Concept Design, Information Society (I-Society), International Conference on, IEEE, XP032224790, ISBN: 978-1-4673-0838-0, 2012, pp. 478-483.
Buyya, Cloud Computing Principles and Paradigms, 2011, 674 pages.
Chong, et al., ISVs are from Mars, and Hosters are from Venus, https://msdn.microsoft.com/en-us/library/bb891759.aspx, Nov. 2007, 28 pages.
Dan, et al., Web services on demand: WSLA-driven automated management, IBM Systems Journal Volume: 43 Issue: 1, 2004, pp. 136-158.
Haslam, Virtualisation arrives for Exalogic 2—Details from Launch Event, http://www.veriton.co.uk!roller/fmw/entry/exalogic_2_details_from_launch, Jul. 26, 2012, 3 pages.
Keahey, et al., Virtual Workspaces for Scientific Applications, 2007, pp. 1-5.
Oracle White Papers, Delivering Database as a Service (DBaaS) using Oracle Enterprise Manager 12c, Available online at:URL:http://www.oracle.com/technetwork/oem/cloud-mgmt/dbaasoverview-wp-1915651.pdf, Oct. 2013, 21 pages.
Oracle, Identity Manager Design Console Guide, Release 9.1.0, Jun. 2008, 208 pages.
Paul et al., Architectures for the future networks and the next generation Internet: A survey, Computer Communications, Elsevier Science,Publishers BV, Amsterdam, NL,Department of Computer Science and Engineering, Washington University in Saint Louis. United States, XP027476826, ISSN: 0140-3664, DOI: 10.1016/J.COMCOM.2010.08.001 [retrieved on Jan. 15, 2010], 2011, pp. 2-42.
Ranganathan, Architecting the Oracle VM solution using the Oracle Sun ZFS Storage Appliances and Oracle Sun Servers, http://www.oracle.com/technetworklarticles/systems-hardware-architecture/vm-solution-using-zfs-storag e-1 74070.pdf, Sep. 2010, 18 pages.
U.S. Appl. No. 13/835,307, Non-Final Office Action dated Feb. 18, 2015, 12 pages.
U.S. Appl. No. 13/835,307, Notice of Allowance dated Jul. 7, 2015, 5 pages.
U.S. Appl. No. 13/836,625, Final Office Action dated Jan. 13, 2016, 46 pages.
U.S. Appl. No. 13/836,625, Non-Final Office Action dated Jun. 19, 2015, 41 pages.
U.S. Appl. No. 13/840,943, Non-Final Office Action dated Dec. 18, 2014, 10 pages.
U.S. Appl. No. 13/840,943, Notice of Allowance dated Jun. 29, 2015, 10 pages.
U.S. Appl. No. 13/844,018, Final Office Action dated Dec. 14, 2015, 21 pages.
U.S. Appl. No. 13/844,018, Non-Final Office Action dated Jun. 11, 2015, 27 pages.
U.S. Appl. No. 13/844,018, Notice of Allowance dated Jul. 14, 2016, 9 pages.
U.S. Appl. No. 13/907,616, Final Office Action dated Jun. 28, 2016, 9 pages.
U.S. Appl. No. 13/907,616, Non-Final Office Action dated Dec. 4, 2015, 9 pages.
U.S. Appl. No. 13/907,689, Final Office Action dated May 21, 2015, 12 pages.
U.S. Appl. No. 13/907,689, Non-Final Office Action dated Jan. 7, 2015, 11 pages.
U.S. Appl. No. 13/907,689, Non-Final Office Action dated Sep. 16, 2015, 17 pages.
U.S. Appl. No. 13/907,689, Notice of Allowance dated Apr. 22, 2016, 8 pages.
U.S. Appl. No. 13/907,728, Final Office Action dated Dec. 17, 2015, 16 pages.
U.S. Appl. No. 13/907,728, Non-Final Office Action dated Jul. 2, 2015, 14 pages.
U.S. Appl. No. 13/907,728, Notice of Allowance dated Aug. 25, 2016, 13 pages.
U.S. Appl. No. 14/624,356, Non-Final Office Action dated Sep. 15, 2016, 9 pages.
U.S. Appl. No. 14/877,835, Non-Final Office Action dated Jun. 17, 2016, 12 pages.
European Application No. 13766777.0, Office Action dated Feb. 10, 2016, 5 pages.
International Application No. PCT/US2013/058638, International Preliminary Report on Patentability dated Jun. 12, 2015, 8 pages.
International Application No. PCT/US2013/058638, International Search Report and Written Opinion dated Jan. 8, 2014, 11 pages.
International Application No. PCT/US2013/058638, Written Opinion dated Apr. 22, 2015, 8 pages.
International Application No. PCT/US2013/058639, International Preliminary Report on Patentability dated Sep. 24, 2015, 8 pages.
International Application No. PCT/US2013/058639, International Search Report and Written Opinion dated Jan. 8, 2014, 10 pages.
International Application No. PCT/US2013/058639, Written Opinion dated Jul. 7, 2015, 6 pages.
International Application No. PCT/US2013/058642, International Preliminary Report on Patentability dated Jan. 20, 2015, 10 pages.
International Application No. PCT/US2013/058642, International Search Report & Written Opinion dated Feb. 7, 2014, 17 pages.

(56) References Cited

OTHER PUBLICATIONS

International Application No. PCT/US2013/058642, Written Opinion dated Sep. 11, 2014, 8 pages.
International Application No. PCT/US2015/016214, International Search Report and Written Opinion dated May 11, 2015, 11 pages.
International Application No. PCT/US2015/016214, Written Opinion dated Jun. 3, 2016, 5 pages.
"World of Warcraft: Catacylsm Can Run When it is Partially", downloaded from URL:https://zhidao.baidu.com/question/315386072.html, (Sep. 3, 2011), 1 page.
U.S. Appl. No. 14/624,356 , Final Office Action dated Mar. 13, 2017, 13 pages.
U.S. Appl. No. 14/877,835 , Notice of Allowance dated Jan. 10, 2017, 13 pages.
China Patent Application No. CN201380046472.4 , Office Action dated Feb. 20, 2017, 25 pages.
Dan et al., Web services on demand: WSLA-driven automated management, IBM Systems Journal vol. 43 Issue: 1, 2004, pp. 136-158.
European Application No. 13766777.0, Office Action dated Nov. 30, 2016, 5 pages.
China Patent Application No. CN201380054681.3 ,Office Action, dated Mar. 31, 2017, 38 pages.
China Patent Application No. CN201380054825.5 , Office Action, dated Apr. 12, 2017, 19 pages.
U.S. Appl. No. 16/016,237, Non-Final Office Action dated Oct. 19, 2018, 14 pages.
U.S. Appl. No. 14/833,985, Notice of Allowance dated Sep. 13, 2018, 6 pages.
U.S. Appl. No. 15/445,617, Notice of Allowance dated Sep. 24, 2018, 9 pages.

\* cited by examiner

SERVICE DEPLOYMENT INFRASTRUCTURE REQUEST PROVISIONING

CROSS-REFERENCES TO RELATED APPLICATIONS

This application claims the benefit and priority under 35 U.S.C. § 119(e) to U.S. Application Ser. No. 62/209,705, entitled "SERVICE DEPLOYMENT INFRASTRUCTURE REQUEST PROVISIONING", filed on Aug. 25, 2015, the entire contents of which are incorporated by reference herein.

BACKGROUND OF THE INVENTION

The present disclosure relates to computer systems, and more particularly to techniques for facilitating and automating the provisioning of resources in a cloud computer system.

Cloud computer is a model for enabling convenient, on-demand network access to a shared pool of configurable computer resources (e.g., networks, servers, storage, applications, and services). The services provided or accessed through the cloud (or network) are referred to as cloud services. Relatively intensive processing may need be performed by a cloud service provider to make cloud services available to a subscribing customer. Due to its complexity, much of this processing is still done manually. For example, provisioning resources for providing such cloud services can be a very labor intensive process.

Provisioning a cloud services is one relatively processor intensive task that may require provisioning of many different resources and/or resources types to enable a specific service request. Because resources can be shared and assigned on demand, provisioning resources for service requests can becomes a complex operation that grows in complexity as many services are continually requested, modified, and released from a cloud infrastructure. Errors can occur in a cloud infrastructure when such operations are performed. Without fine grained and adaptable error identification and error handling techniques, error detection and handling can become unmanageable and/or labor intensive.

BRIEF SUMMARY OF THE INVENTION

Embodiments are disclosed of a computer system for provisioning, managing and tracking of services provided by a computer infrastructure system. Specifically, techniques are disclosed for managing detection and resolution of errors during processing of tasks to enable a service. These techniques may be implemented in many different computer environments, such as an enterprise computer system and a cloud computer system, which may have a computer infrastructure system to provide services.

In certain embodiments, a computer infrastructure system includes a service deployment infrastructure (SDI), which is implemented as a computer system. The SDI can perform the tracking, management and provisioning for services subscribed to by customers of the computer infrastructure system. In certain embodiments, the SDI processes large volumes of provisioning requests and delivers time critical applications to customers. The SDI can identify tasks for enabling services. The tasks can be of varying number and/or complexity depending upon requirements, configurations, and options associated with each request. In some embodiments, the SDI imposes request level and task level control and management in order to execute, rollback, retry or fail a request or a task automatically and accurately.

A request may indicate an order (e.g., a subscription order) for one or more services requested by a user (e.g., customer) The SDI identifies a set of one or more tasks associated with each service and stores information associated with the services and the tasks in a database. In some embodiments, the SDI schedules the processing tasks associated with each request. In certain embodiments, the SDI may assign various states to a service request based on assigned states of tasks associated with the service request. Upon successful execution of the tasks associated with a service request, the SDI can provisions resources (e.g., memory and processing resources) for the request.

In some embodiments, the SDI is configured to identify a maintenance window (MW) associated with a task and schedule the execution of the task when the MW is reached. In some examples, the MW may specify a period of time required for the task to complete execution.

The SDI may be configured to receive a request to cancel processing of a service request during execution of the request. The SDI may be configured to identify a task associated with the request that is currently executing and perform a rollback operation from the identified task to restore the request to a state associated with the request when a previous task associated with the request was successfully performed. In some embodiments, the SDI may perform the rollback from the identified task in accordance with one or more rollback retry policies. In some examples, the rollback retry policies may specify at least one of a retry interval for the identified task, a retry duration for the identified task and a total duration of the rollback operation.

Techniques disclosed herein can include receiving, by a computer system of a cloud infrastructure system, a first request for a service provided by the cloud infrastructure system. The techniques can further include determining a first process for provisioning the service, wherein the first process includes performing a first plurality of tasks, and wherein each of the first plurality of tasks is related to provisioning one of a plurality resources for the cloud infrastructure system to enable the service. The techniques can additionally include performing the first process, wherein performing the first process includes invoking each of the first plurality of tasks. The techniques can also include detecting an error related to invoking a task of the first plurality of tasks. The techniques can include identifying a first error type of the error related to invoking the task, the first error type being one of a plurality of error types, The techniques can further include identifying a first resource type of a resource related to provisioning for the task related to the error, wherein the resource is one of the plurality of resources. The techniques can additionally include selecting a first error handling process from an error policy of the cloud infrastructure system, wherein the first error handling process is selected according to the identified first error type and the identified first resource type. The techniques can include initiating the selected first error handling process.

The first plurality of tasks can be invoked according to an order defined for the first process. An error handling process selectable from the error policy can be a roll-back error handling process to release one or more resources provisioned by a task of the first plurality of tasks in an order reverse to the order defined for the first process. The techniques can include determining whether at least one of the first error type and the first resource type indicates that the error is a non-recoverable error; and, upon determining that the least one of the first error type and the first resource type indicates that the error is not a non-recoverable error and the selected first error handling process is the roll-back error handling process, selecting a retry error handling process, wherein the retry error handling process includes performing the first process to reinvoke each of the first plurality of tasks in the order defined for the first process.

The first process can be performed a threshold number of times based on at least one of the first error type and the first resource type. The first error handling process can be selected from the error policy is a retry error handling process, and wherein the retry error handling process includes reinvoking the task to provision the resource. The first error handling process selected from the error policy can be a delay error handling process, and wherein the delay error handling process includes delaying reinvoking of the provisioning of the resource. The techniques can further include receiving an indication from a resource manager associated with the resource, the indication signifying that the resource is not available for provisioning based on a determination that usage of a resource type of the resource has met a threshold. The delay error handling process can be selected in response to receiving the indication. The delay error handling process can include delaying the provisioning of the resource, the delaying including preventing a request from being transmitted to the resource manager associated with the resource to provision the resource for a time period.

The first error handling process selected from the error policy can be a retry error handling process. The retry error handling process can include reinvoking the task for a threshold number of times, the threshold number of times selected from a plurality of different retry thresholds based on at least one of the first error type and the first resource type. The techniques can also include selecting the first error handling process from the error policy of the cloud infrastructure system according to the first error type and the first resource type; and selecting a second error handling process from the error policy of the cloud infrastructure system according to the first error type and a second resource type, the second resource type being different from the first resource type. The techniques can include selecting the first error handling process according to the first error type and the first resource type; and selecting a second error handling process according to a second error type and the first resource type, the second error type being different from the first error type.

The techniques can additionally include receiving an error indicator from a resource manager associated with the resource, the error indicator including an error code indicative of a type of error associated with provisioning the resource by the resource manager. The error handling process can be further selected from the error policy based on the error code. The first error handling process can be further selected from the error policy based on the first resource type and a previously identified resource type, the previously identified resource type associated with a previously identified error associated with a previous attempt to provision the resource The first error handling process can be further selected from the error policy based on the first error type and a previously identified error type, the previously identified error type associated with a previously identified error associated with a previous attempt to provision the resource.

The techniques can also include receiving a plurality of requests, each request of the plurality of requests for provisioning a service provided by the cloud infrastructure system. The techniques can additionally include determining a process for provisioning one or more resources for each request of the plurality of requests. The techniques can include determining a set of requests in the plurality of requests to perform within a time period. The techniques can also include initiating each request in the set of requests during the time period. The techniques can include determining the requests from the plurality of requests based on a request type associated with each of the plurality of requests.

The techniques can include receiving a second request for a service provided by the cloud infrastructure system. The techniques can also include determining a second process for provisioning the second service, wherein the second process includes performing a second plurality of tasks, and wherein each of the second plurality of tasks is related to provisioning one of the plurality resources for the cloud infrastructure system to enable the second service. The techniques can additionally include performing the second process, wherein performing the second process includes invoking each of the second plurality of tasks. The techniques can further include detecting a second error related to invoking a second task of the second plurality of tasks. The techniques can also include identifying a second error type of the second error related to invoking the second task, the error type being one of the plurality of error types. The techniques can additionally include identifying a second resource type of a resource related to provisioning for the second task related to the second error, wherein the resource is one of the plurality of resources. The techniques can further include selecting a second error handling process from the error policy of the cloud infrastructure system, wherein the error handling process is selected according to the identified second error type and the identified second resource type. The instructions can include initiating the selected second error handling process.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Illustrative embodiments of the present invention are described in detail below with reference to the following drawing figures.

DETAILED DESCRIPTION OF THE INVENTION

Figure 1A:
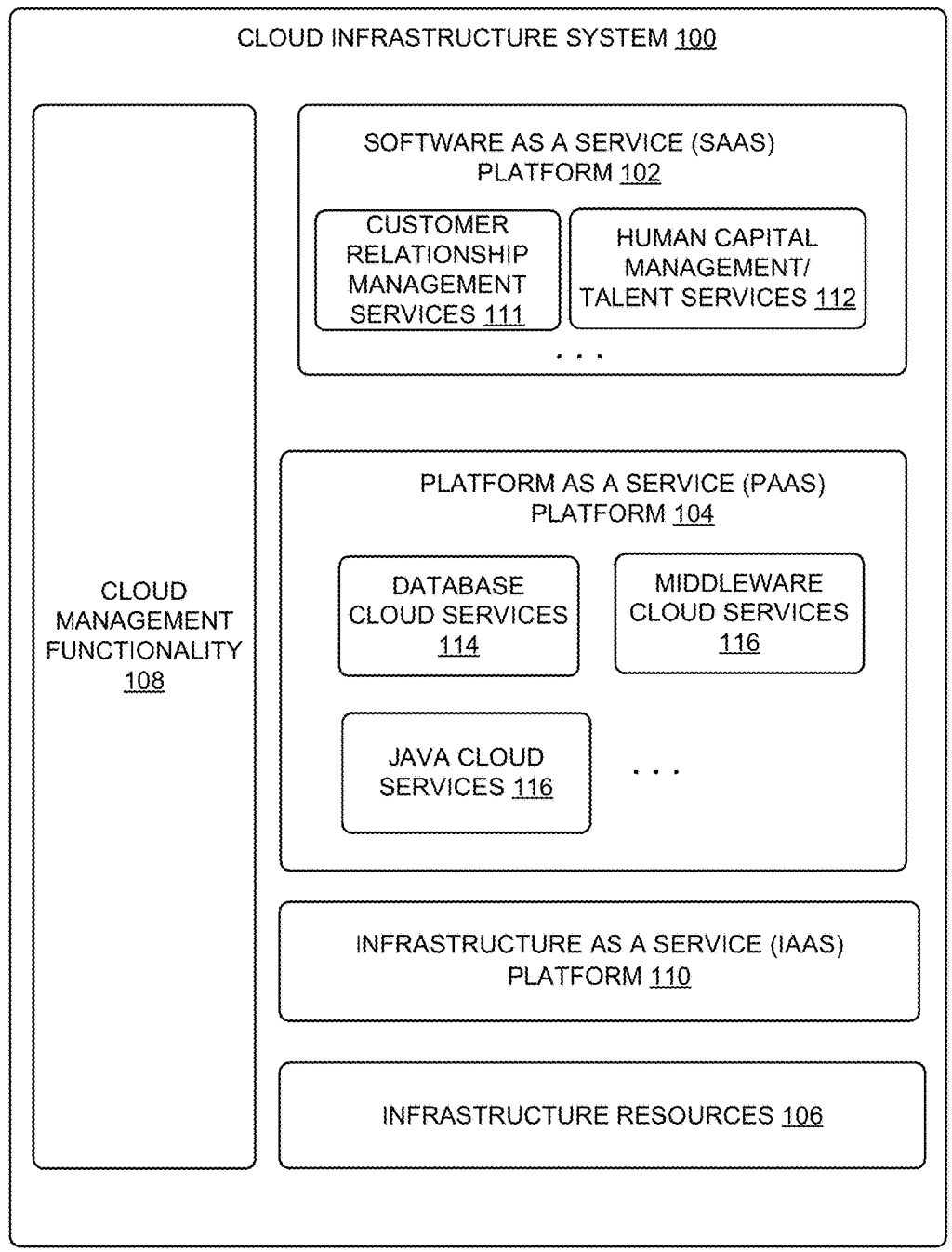
FIG. 1A is a logical view of a cloud infrastructure system according to one embodiment.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments provide techniques for automating the provisioning, managing and tracking of services provided by a cloud infrastructure system. An example of such a computer infrastructure system is a cloud infrastructure system such as the Oracle Public Cloud provided by the present assignee.

In certain embodiments, a cloud infrastructure system may include a suite of applications, middleware and database service offerings that are delivered to a customer in a self-service, subscription-based, elastically scalable, reliable, highly available, and secure manner.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 111 (e.g., Fusion CRM services provided by the Oracle cloud), Human Capital Management (HCM)/Talent Management services 112, and the like. CRM services 111 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computer resources such as storage, networks, and other fundamental computer resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
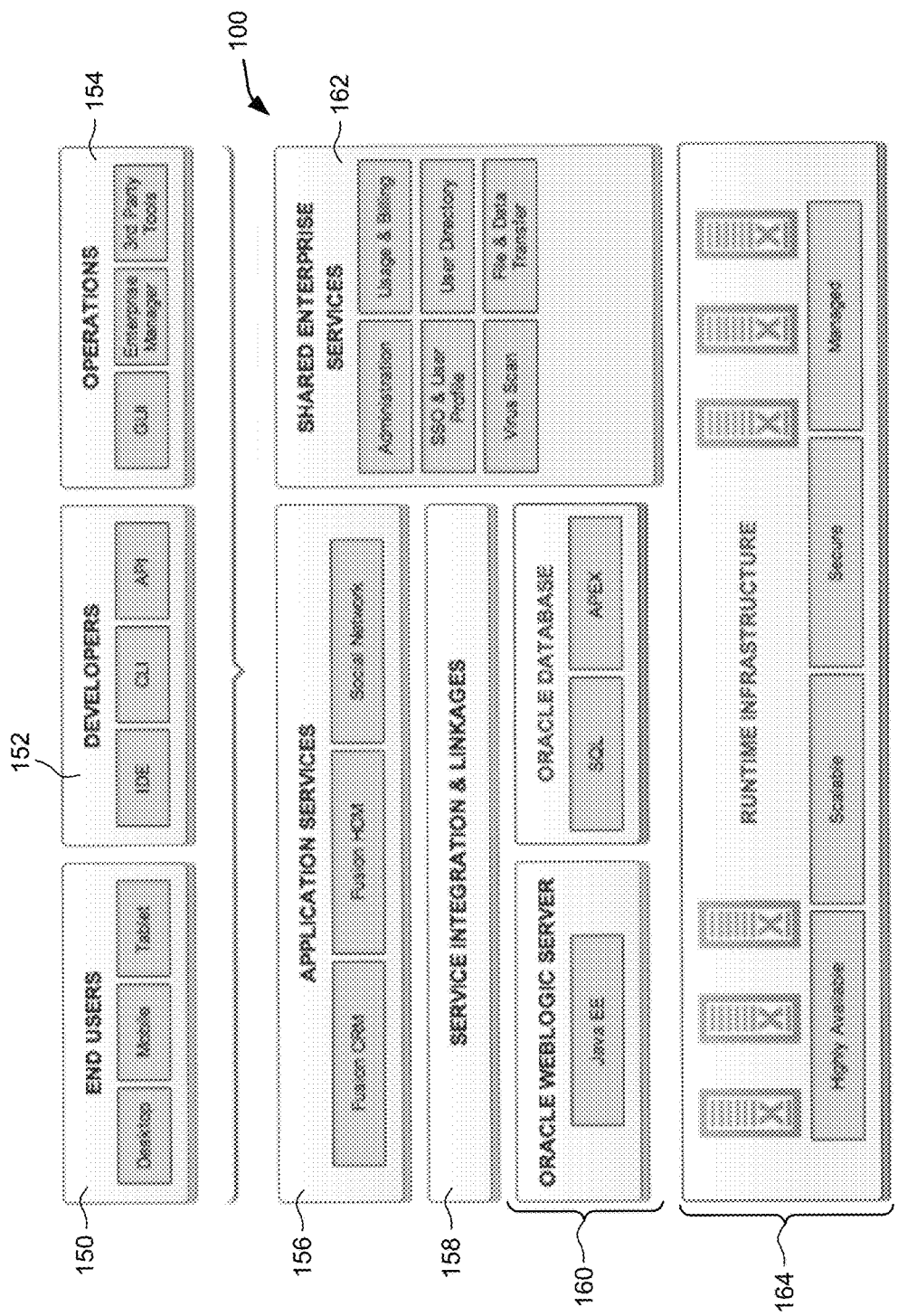
FIG. 1B is a simplified module diagram of a hardware/software stack that may be used to implement a cloud infrastructure system according to an embodiment.

FIG. 1B is a simplified module diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

In some embodiments, the cloud services described above may be offered as services via a cloud environment.

Figure 2:
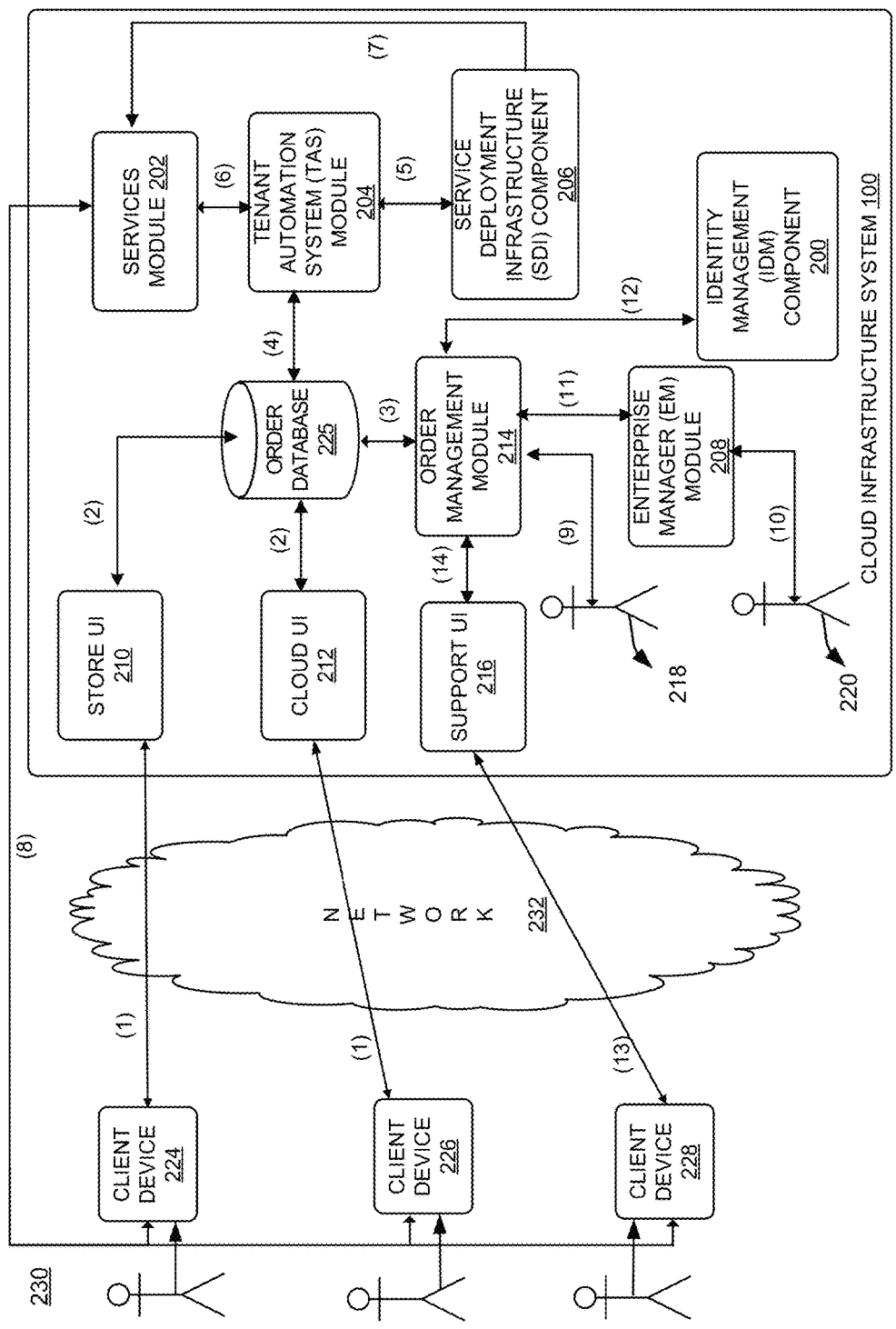
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computer devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computer devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computer device. For example, client computer devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computer devices, any number of client computer devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computer devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 225. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computer resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 225, which can be one of several databases operated by cloud infrastructure system 100 and utilized in conjunction with other system elements. While order database 225 is shown logically as a single database in FIG. 2, in actual implementation, this may comprise one or more databases.

At (3), the order is forwarded to order management module 214. Order management module 214 is configured to perform billing and accounting operations related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS module 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 operations as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related operations such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
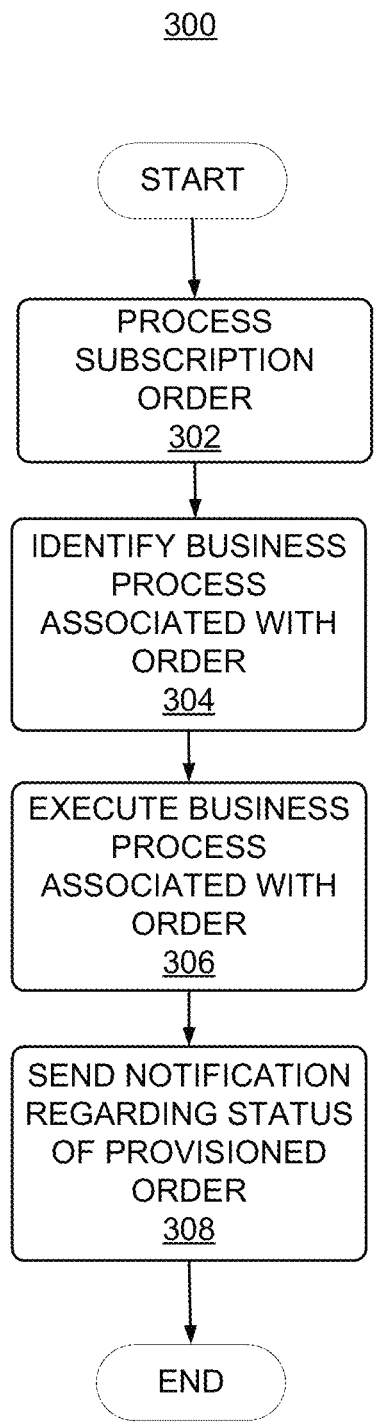
FIG. 3A depicts a simplified flowchart 300 depicting processing that may be performed by the TAS module in the cloud infrastructure system, in accordance with an embodiment.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS module 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office operations such as creating a customer record for the user, performing accounting operations related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
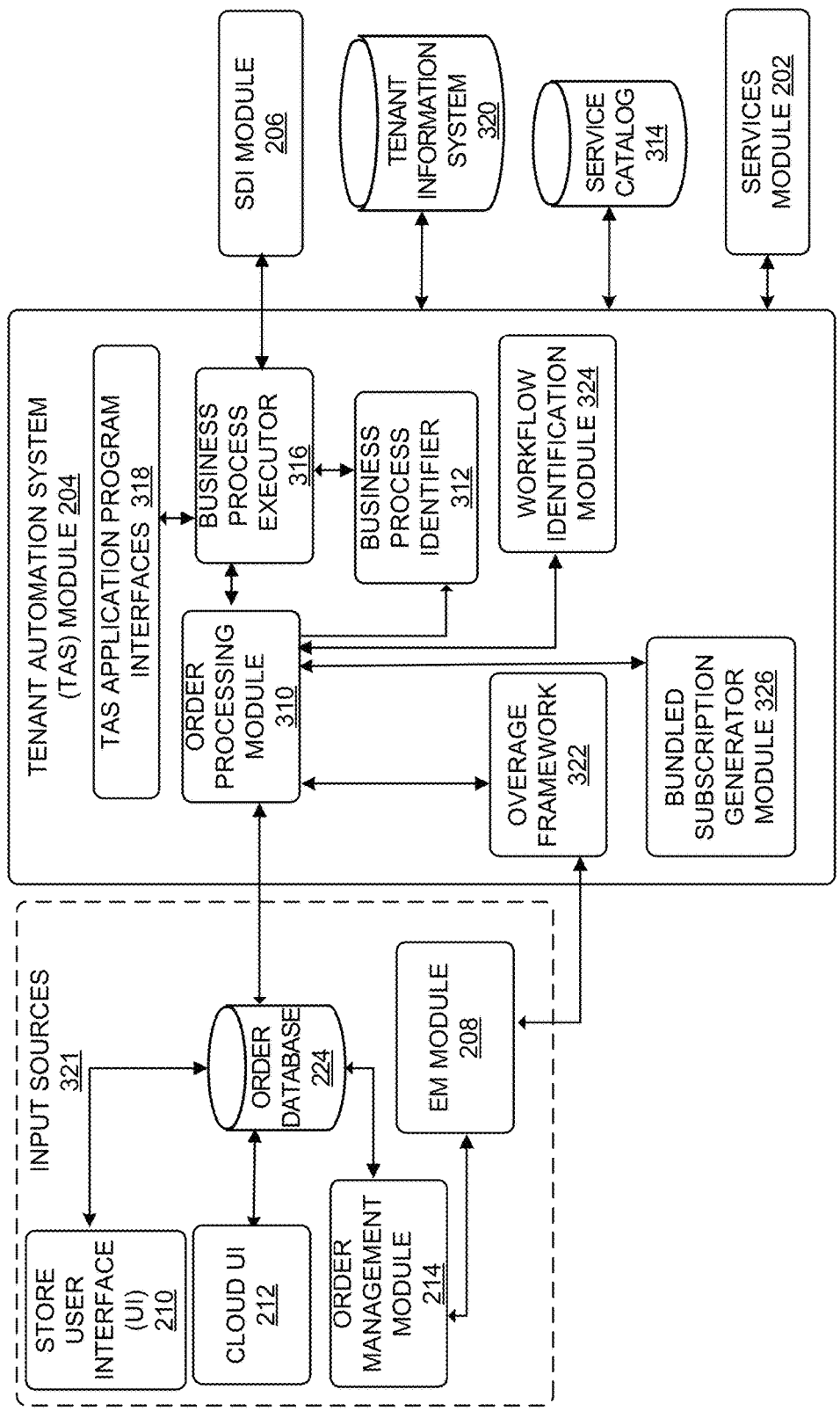
FIG. 3B depicts a simplified high level diagram of one or more sub-modules in the TAS module in the cloud infrastructure system, in accordance with an embodiment.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 225. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI module 206 to allocate resources and configure resources needed to fulfill the particular step. SDI module 206 is responsible for the actual allocation of the resources. Once all the steps of the business processes of an order have been executed, business process executor 316 may send a notification to the customer of the processed order by utilizing the services of services module 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services module 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
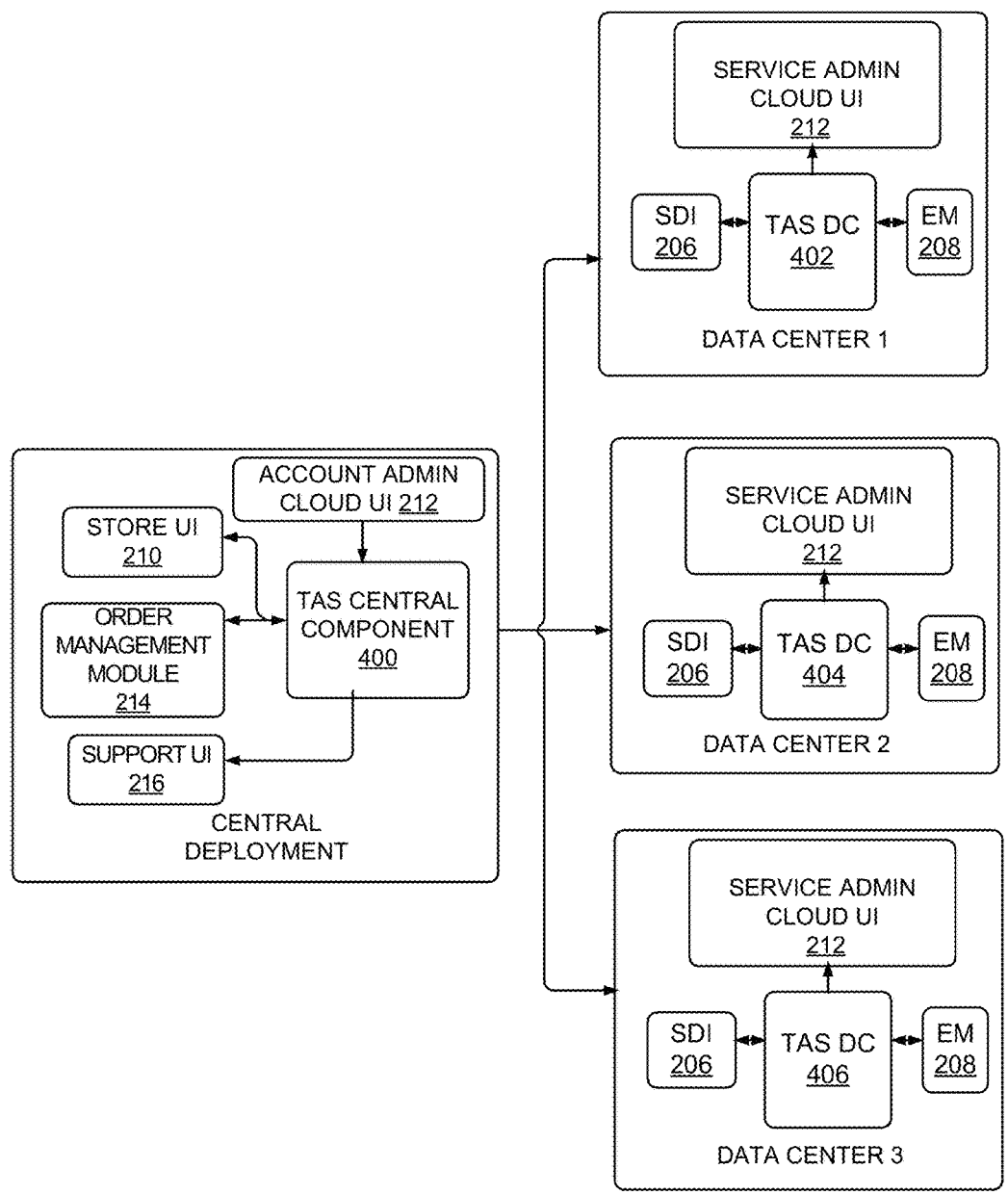
FIG. 4 depicts an exemplary distributed deployment of the TAS component, according to an embodiment.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management module 214, or via order database 225. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 206 to orchestrate the provisioning of physical resources for the order. SDI module 206 in respective TAS DCs 402, 404 or 406 allocates resources and configures those resources needed to fulfill the subscription order.

In certain embodiments, TAS DCs, 402, 404 or 406 identify an identity domain associated with the subscription. SDI module 206 may provide the identity domain information to IDM module 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management module 214.

Figure 5:
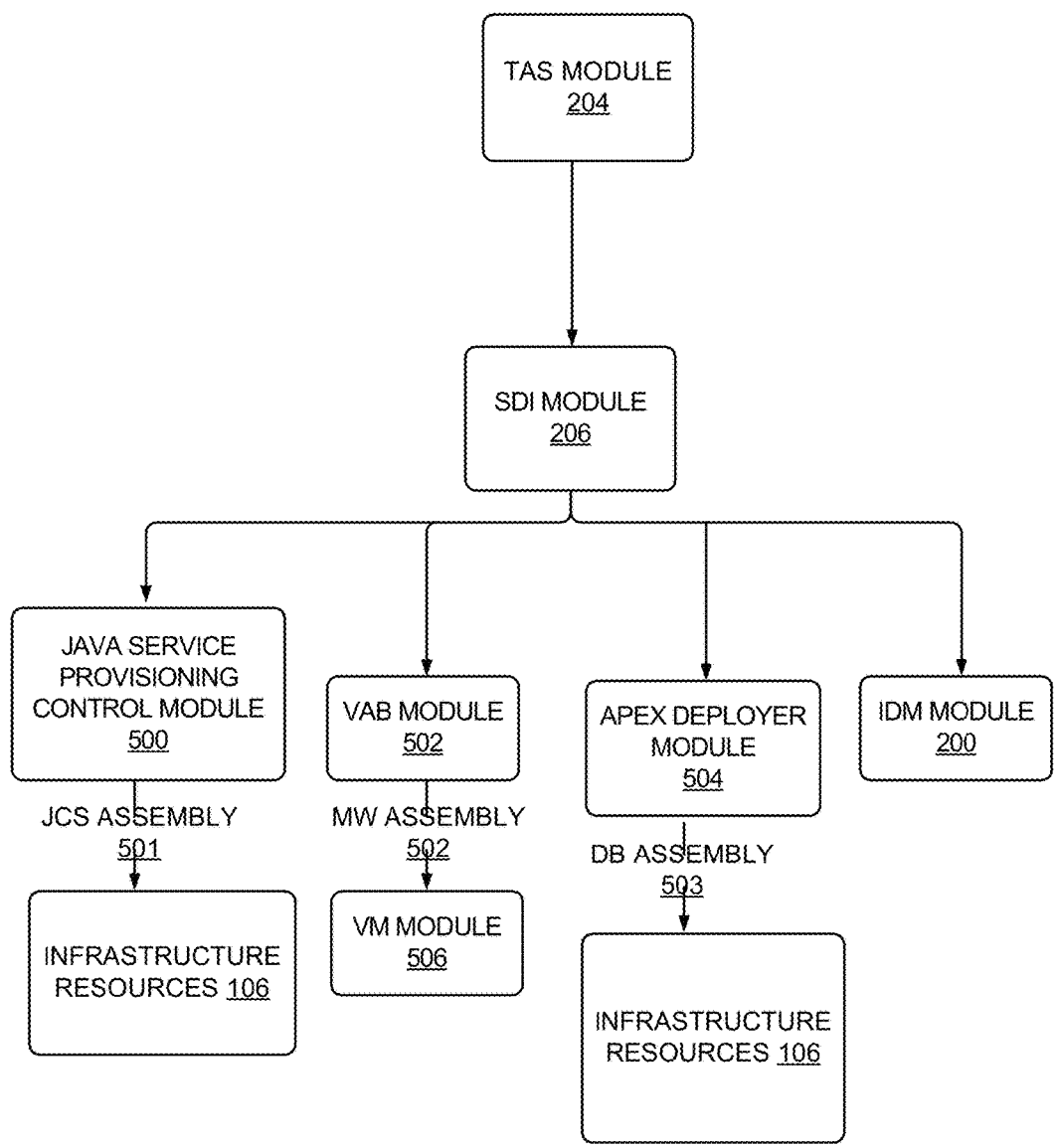
FIG. 5 is a simplified block diagram illustrating the interactions of the SDI module with one or more modules in the cloud infrastructure system, in accordance with an embodiment.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
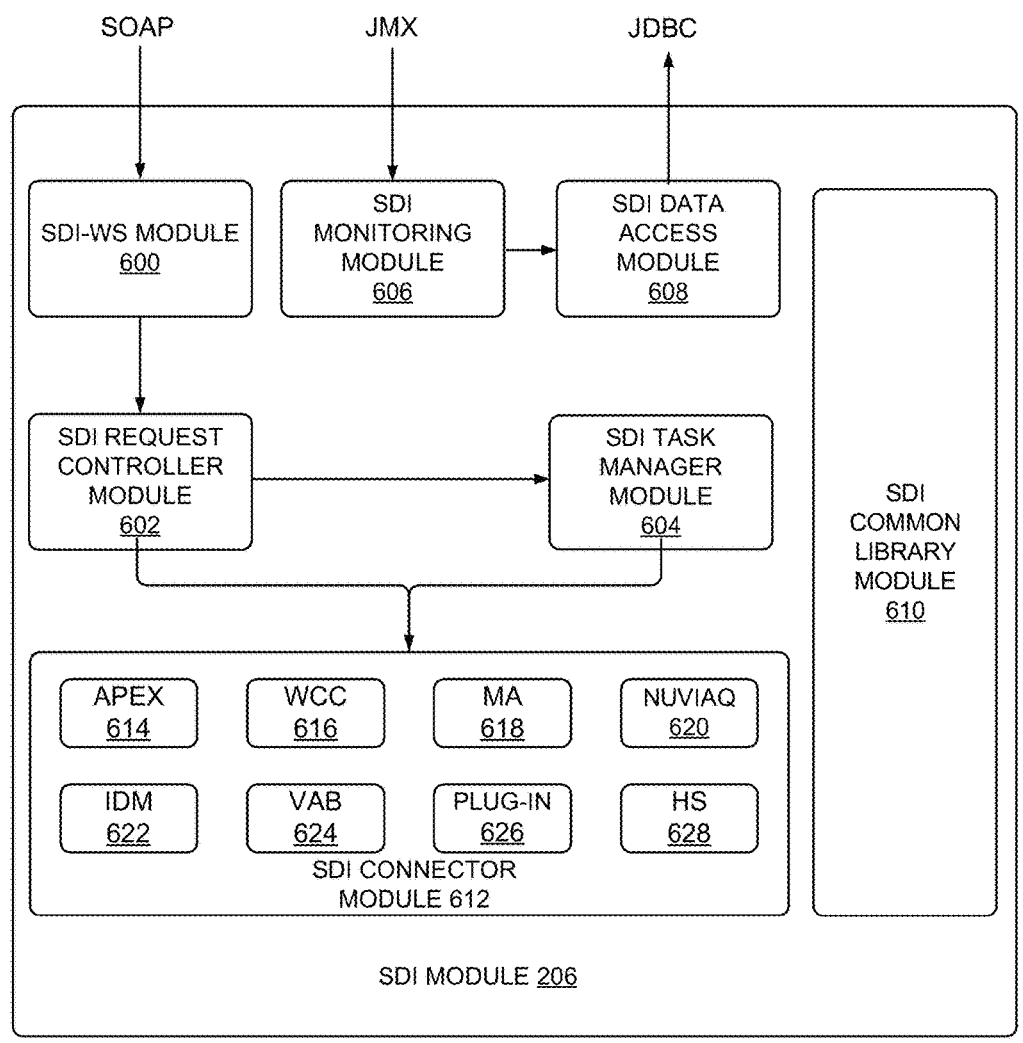
FIG. 6 depicts a simplified high level diagram of sub-modules of the SDI module according to an embodiment.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their operations are described in detail below.

SDI-WS module 600 includes capabilities for receiving a step in the business associated with an order from business process executor 316 of TAS module 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7:
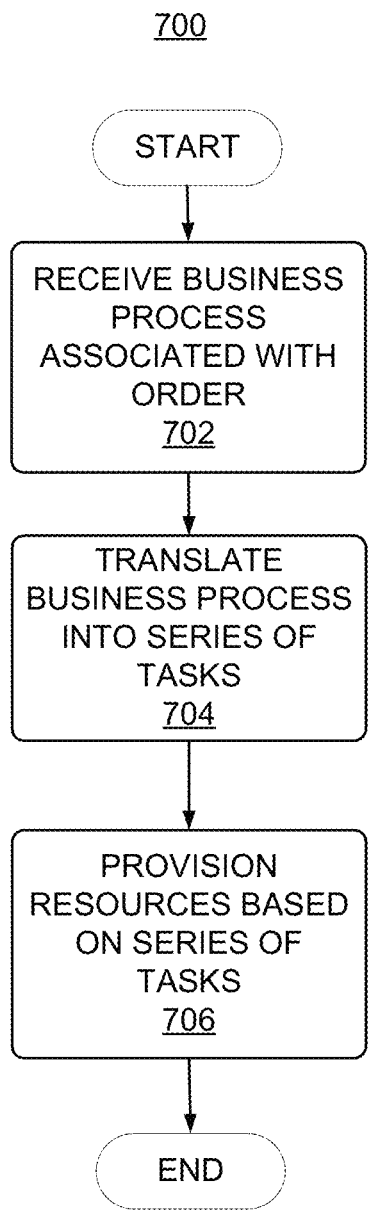
FIG. 7 depicts a simplified flowchart depicting processing that may be performed by the SDI component in the cloud infrastructure system, in accordance with an embodiment.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 8:
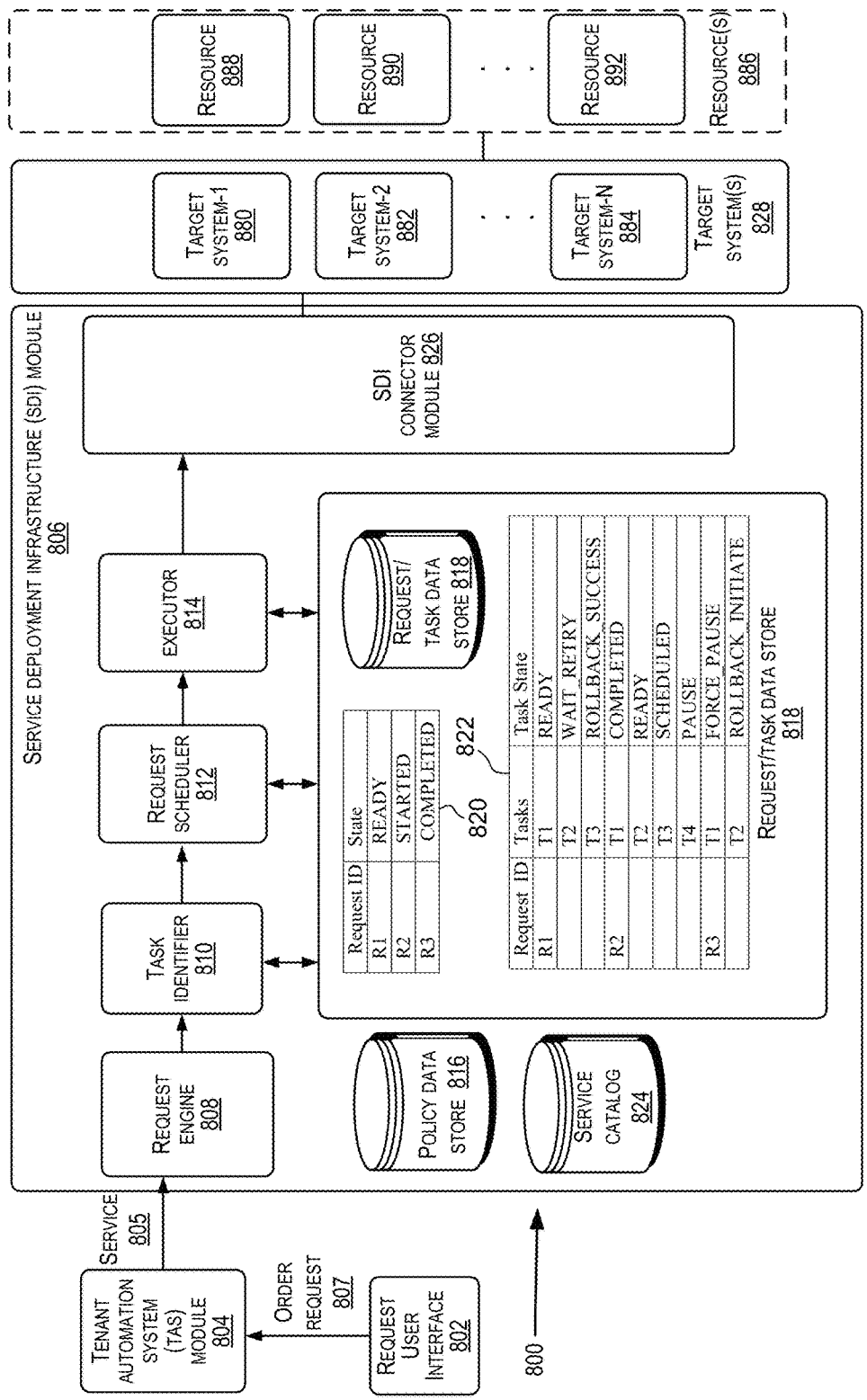
FIG. 8 depicts a simplified high level diagram of a system including an SDI module to manage request provisioning, in accordance with an embodiment.

FIG. 8 depicts a simplified high level diagram of the manner in which an SDI module in the cloud infrastructure system depicted in FIG. 1 may perform the tracking, management and provisioning of services subscribed to by customers of the cloud infrastructure system, in accordance with an embodiment of the present invention. In the embodiment depicted in FIG. 8, the SDI module includes a request engine 808, a task identifier 810, a request scheduler 812, a request/task executor 814, a request/task data store 818, a policy data store 816, a service catalog 824 and SDI connectors 880. These components may be implemented in hardware, or software, or combinations thereof. In other embodiments, SDI module 806 may have more or fewer modules than shown in FIG. 8, may combine two or more modules, or may have a different configuration or arrangement of modules.

Request Processing

In accordance with some embodiments, SDI module 806 may be configured to perform the scheduling and processing of order requests from TAS module 804. SDI module 806 may perform operations described with reference to SDI throughout this disclosure, such as SDI module 206.

In the embodiment shown in FIG. 8, TAS module 804 receives an order request from a customer via a request user interface (UI) 802. For instance, a customer may access a cloud user interface (UI) (e.g., 212, 214 and/or 216 shown in FIG. 2) in request UI 802 and place a subscription order via the UI. Order request may include subscription information about a subscription order. TAS module 804 may then be configured to perform the initial processing of the order. For example, TAS module 804 may identify processes associated with the order and apply logic to determine whether the order should proceed to provisioning. Once TAS module 804 determines that the order for the customer should be provisioned, TAS module 804 communicates the order request to SDI module 806. For instance, TAS module 804 may interact with SDI module 806 via a communication protocol, such as an asynchronous Simple Object Access Protocol (SOAP). TAS module 804 804 may send a SOAP request to SDI module 806 to enable the provisioning of the order request for the customer.

Upon receiving the order request from TAS module 804, in some embodiments, request engine 808 in SDI module 806 identifies one or more services specified in the order request. For instance, request engine 808 may identify that the order request includes a CRM service and a Java service. In some embodiments, SDI module 806 may include a task identifier 810. Task identifier 810 may be configured to identify a set of tasks for each service specified in the order request. In some examples, the tasks identified by task identifier 810 for an order request may be service specific and vary from one service to another. For instance, task identifier 810 may be configured to identify a first set of tasks for a first service specified in the order request and a second set of tasks for a second service specified in the order request.

As illustrated, requests can be associated with varying numbers of tasks to perform each request. Certain tasks can be associated with provisioning resources to enable a service request. In certain embodiments, resource provisioning tasks are performed sequentially in an order specified for each request type in order to violate resource allocation dependencies associated with provisioning the resources. Alternatively, one or more tasks can be performed in parallel. Each service request can, via a policy, be determined to be delineated into a plurality of tasks. The policy can determine which tasks are to be performed, the order of the tasks, or other information related to performance of the tasks. For example, a policy can include one or more processes for provisioning a service. Each of the processes can be associated, via a policy, with a plurality of tasks, as disclosed herein.

When a request for a service provided by cloud infrastructure is received by an SDI module, the SDI module can determine one or more processes for enabling the requested service. Some of these processes can be for provisioning one or more resources. Each process can be further delineated into a plurality of tasks. Each task can be an atomic task of a process. When each of the tasks is completed, the process can be completed. Certain tasks can attempt to provision a certain resource or type of resource. A process can define or otherwise be associated with a number of tasks and/or an order of tasks to complete the process.

Resources can include, but are not limited to, computer resources (e.g., memory, processing allocation, network ports, etc.), software products, applications (e.g., cloud-based applications, enterprise applications, or any other applications), cloud services, various types of data (e.g., networked files, directory information, databases, or the like), and other resources. In some embodiments, resources may include one or more computer systems, databases, lightweight directory access protocol (LDAP) servers, Active Directory (AD) systems, Email Systems, UNIX systems and the like. For example, a target system may be an Active Directory (AD) system that provides access to active directory services to access an Active Directory server. Resources can also be organized by and/or be a resource manager including one or more target systems/resources. For example a resource manager can be a database or virtual machine resource manager comprising multiple database and/or virtual machine resources. It should be understood that a resource manager can be arranged in a multitude of arrangements and are not limited to being arranged only by resource type. A resource manager can request its own resources.

Upon identifying a set of tasks to enable a service identified in the order request, task identifier 810 stores information related to the order request and the identified tasks associated with the order request in a request/task data store 818. In the embodiment depicted in FIG. 8, request/task data store 818 may include a request information table 820 and a request-task information table 822. Request information table 820 may store information such as a request ID and a request state. For instance, R1 may correspond to a first service request (e.g., ODBC service) specified in the order request, R2, may correspond to a second service request (e.g., JAVA service) specified in the order request, R3 may correspond to a third service request (CRM service) specified in the order request, and so on.

In some embodiments, request information table 820 may store 'state' information associated with each request. Various states may be associated with a request. These states may include, for example without limitation, a 'ready' state to indicate a creation of a request in the database (e.g., request/task data store 818), a 'started' state to indicate that a task associated with the request is currently executing, a 'completed state' to indicate the state of the request after all tasks identified for the request have been completed, a 'pausing' state to indicate that the request is deprecated or suspended, a 'paused' state to indicate that a task associated with the request has failed, a 'cancelling' state to indicate that the request has started cancelling, a 'cancelled' state to indicate that the request has been cancelled, a 'cancel paused' state to indicate that the request to cancel the request has failed, a 'cancel interrupted' state to indicate that the request to cancel was interrupted, a 'wait continue' state to indicate that the request is waiting in a queue and so on.

In some embodiments, request-task information table 822 may store information about tasks associated with a request. For instance, request-task information table 822 may identify for each request, each of the tasks for enabling a service for the request and the 'state' of execution that the task is currently in. In an embodiment, the tasks associated with each request may be executed in a serialized manner according to a process for provisioning to enable a service. The Process may define an order for execution of the tasks. However, the requests (e.g., R1, R2 and R3) itself may be processed by request engine 808 in parallel. SDI module 806 may be configured to receive multiple order requests simultaneously from TAS module 804, in certain embodiments. Additionally, while the embodiment depicted in FIG. 8 illustrates different services (R1, R2, R3) specified in a single order request, in other embodiments, the order request may specify only a single request.

As noted above, in certain embodiments, various states may be associated with a task. These states may include, for instance, a 'ready' state to indicate the creation of a task associated with a request, a 'started' state to indicate that a task has begun executing, a 'wait-retry' state to indicate that a task has failed and is waiting in the queue to retry, a 'wait-continue' state to indicate that a task has not yet completed and is waiting in the queue, a 'completed' state to indicate that a task has completed, a 'failed' state to indicated that a task has failed and that there are no more retries available for the task, a 'rollback-success' state, a 'rollback-failed' state, a 'rollback-fail-skipped' state and so on. In some embodiments, the states associated with a task may include a 'failed' state to indicate that the task has failed, a 'success' state to indicate that the task has completed, an 'incomplete' state to indicate that the task is incomplete, a 'rollback success' state to indicate that a rollback operation performed for the task was successful, a 'rollback failed' state to indicate that a failure of a rollback operation performed for the task, a 'force paused' state and so on.
Request Scheduling In accordance with certain embodiments, request scheduler 812 may be configured to schedule the execution of requests according to a time period. The time period may be pre-specified, being defined by one or more intervals of time. For instance, request scheduler 812 may be configured with a timer to select a request for execution every 5 seconds from request information table 820. Upon identifying a request to execute, request scheduler 812 may then be configured to update the 'state' of the request. For instance, request scheduler 812 may be configured to update the state of the request from a 'ready' state to a 'started' state to begin execution of the request.

In certain embodiments, executor 814 may be configured to identify one or more tasks associated with a request and begin execution of the tasks associated with the request in a serialized manner. For instance, executor 814 may be configured to pick up a first task identified in a list of tasks associated with the request and update the state of the task. For example, executor 814 may be configured to update the state of the task from a 'ready' state to a 'started' state to begin execution of the task.
Maintenance Window (MW)

In some embodiments, the tasks associated with a request may include a maintenance window (MW). The MW allows a task to be executed within a specific execution window (e.g., during a time period). For example, certain tasks may have a run-time impact on the customer. The MW enables such tasks to be scheduled to execute at a future time. In an embodiment, the MW may specify a time period (e.g., 5 seconds) taken by a task to complete execution. In some examples, the MW may specify the time taken by one or more sub-tasks associated with the task to be executed. In some embodiments, the MW associated with a task may be represented as a period of time that is required for the task to complete and may include a start time and an end time. In some examples, the MW may include additional information such as customer information and service specific information. In an example, information related to MWs associated with tasks may be stored in request/task data store 818.

The MWs associated with a task may be task specific and may be configured differently for different tasks. For instance, the MW specified for a task that involves a resource (e.g., a server) to re-start may be different from a MW specified for a different task. In certain embodiments, the MW period is longer than the desired time of execution of the task or sub-tasks within the task that requires the MW.

In certain embodiments, upon identifying a task to execute, executor 814 may perform the following operations. First, executor 814 may determine if the identified task requires a maintenance window. If there is a MW associated with the task, then executor 814 schedules the task to be executed at the closest MW and updates the state of the request associated with the task to a 'scheduled' state. If no MW is found for the task, the executor 814 updates the state of the request to a 'paused state' and waits for an administrator to enter a MW. When the MW period arrives, executor 814 picks up the 'scheduled' request and executes the task associated with the request.

Policies to Control Flow of Requests

In certain embodiments, an SDI module may include a service catalog 824. The service catalog can store information related to types of services that a customer of the cloud infrastructure system may subscribe to. Services may include, for example, Customer Relationship Management (CRM) services (e.g., Fusion CRM services provided by the Oracle cloud), Human Capital Management (HCM)/Talent Management services and the like. CRM services may include services directed to reporting and management of a sales activity cycle to a customer, and others. HCM/Talent services may include services directed to providing global workforce lifecycle management and talent management services to a customer. \

As disclosed herein, SDI module 806 can delineated a service request into one or more processes. Each process can be further delineated into one or more tasks. Some tasks and/or processes can provision resources to enable a service. SDI module 806 can also implement an error handling policy of a cloud infrastructure including performing error handling according to rule(s) of the error handling policy. The rule(s) can contain certain error handling procedures depending upon an error type and/or resource type associated with each task. Thus, during the flow of execution of a plurality of tasks to enable requests, SDI module 806 can collect error types and/or resource types for error, consult an error handling policy, and implement, in an automated fashion, error handling procedures.

In certain embodiments, A mapping can be maintained between a task and a request thread. In the event of server downtime, when a request is running, SDI module 806 can detect a halted request and re-process it. SDI module 806 may be configured to perform retries on failed tasks based on retry rules defined per task with a retry interval and retry duration, delay one or more tasks based on a delay time duration based on delay rules, add/or perform rollback error handling procedures based on rollback rules.

Initiated Error Handling, Cancelled Requests and Rollbacks

In accordance with certain embodiments, request scheduler 812 may receive an internal request from request engine 808 to perform a cancel operation for the processing of a request that is currently in execution. In such a situation, request scheduler 812 can identify tasks associated with the request that have already executed and then execute a rollback operation to restore the request to a state that the request was in when the previous task finished.

For instance, consider that a request is associated with tasks, T1, T2 and T3 and an exception occurs during the execution of task T3. Request scheduler 812 may receive a request from request scheduler 812 to cancel the processing of request R1. The cancel may be initiated by a user or driven based on occurrence of an event, such as time. In an embodiment, request scheduler 812 may initiate a rollback of the tasks from T3 to one or more previous stages (e.g., T2 and T1) to restore the request R1 to a state that the request was in when T2 finished. In some embodiments, in order to perform the rollback operation, request scheduler 812 may automatically generate a new request with a set of tasks associated with the new request to be executed in reverse order (i.e., T3, T2 and T1) and provide the new request to request scheduler 812. Request scheduler 812 may add the new request to a queue of requests stored in request/task data store 818. Request scheduler 812 may then schedule the execution of the request as discussed above.

In certain embodiments, the rollback of tasks associated with requests may be associated with a retry policy. The retry policies may be stored in policy data store 816. The retry policy may specify rules that specify a threshold number of times that a task can be reinvokved. In some examples, the retry policy for a task may include a retry interval that specifies a retry interval for the task, an interval time unit that specifies a time unit for the retry interval, a retry duration that specifies the total time that the task will be reinvoked and a duration time limit that specifies a time unit for the total duration of the retry operation.

In certain embodiments, SDI module 806 may provide additional operations related to the management and provisioning of requests. For instance, to introduce flexibility of request control, SDI module 806 may configure a FORCE PAUSE operation per task, service type, request type, or deployment type. For long running tasks, SDI module 806 may use an asynchronous implementation and poll results at an interval specified in the tasks. The polling interval may be customized to achieve better efficiency for different tasks and scenarios. In some embodiments, SDI module 806 may support asynchronous rollback of a task.

Request Management

In certain embodiments, SDI module 806 may perform request management. For instance, a user (e.g., an administrator) of the cloud infrastructure system can pause, resume or cancel a request. The administrator can list and get tasks details of a request. When the cloud infrastructure system is not able to recover from a failed task, the administrator may be given the option to forcibly skip the failed task and let the request engine pick up the next task. In certain situations, an administrator can abort a running request. The aborted request is not processed again to ensure no inappropriate action taken.

SDI connector module 826 includes one or more connectors for handling the deployment of tasks specified by executor 814 to provision one or more services related to the order request. In certain embodiments, one or more of the connectors may handle tasks that are specific to a particular service type while other connectors may handle tasks that are common across different service types. In one embodiment, SDI connector module 826 includes a set of connectors (wrapper APIs) that interface with one or more target systems 828 in the cloud infrastructure system to provision the services and resources related to the order request. For example, an Application Express (APEX) connector may interface with an APEX deployer module in target systems 828 to provision database services. A Web Center Connector (WCC) may interface with a web center module in target systems 828 to provision web services. For example, the web center module may be a user engagement platform that includes capabilities for delivering connectivity between people and information in cloud infrastructure system.

Target systems 828 can include, but are not limited to, software products, applications (e.g., cloud-based applications, enterprise applications, or any other applications), cloud services, various types of data (e.g., networked files, directory information, databases, or the like), resource managers, and other resources. In some embodiments, target systems may include one or more computer systems, databases, lightweight directory access protocol (LDAP) servers, Active Directory (AD) systems, Email Systems, UNIX systems and the like. For example, a target system may be an Active Directory (AD) system that provides access to active directory services to access an Active Directory server. Target systems can also be organized by and/or be a resource manager including one or more target systems/resources. For example a resource manager can be a database or virtual machine resource manager comprising multiple database and/or virtual machine resources. It should be understood that resource manager can be arranged in a multitude of arrangements and are not limited to being arranged only by resource type. A resource manager target system can request its own resources. For example, Target system-1 880 is illustrated as being associated with resource 888 of resource(s) 886. Resource(s) 886 may also include may include one or more databases, lightweight directory access protocol (LDAP) servers, Active Directory (AD) systems, Email Systems, UNIX systems and the like), or other resources.

FIGS. 9-12 illustrate example flow diagrams showing respective processes 900, 1000, 1100, and 1200 of processing service requests according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular operations or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the SDI module 806 (e.g., utilizing at the request engine 808, the task identifier 810, the request scheduler 812 and the executor 814) shown in FIG. 8 may perform the process described with reference to FIGS. 9-12 respectively.

Figure 9:
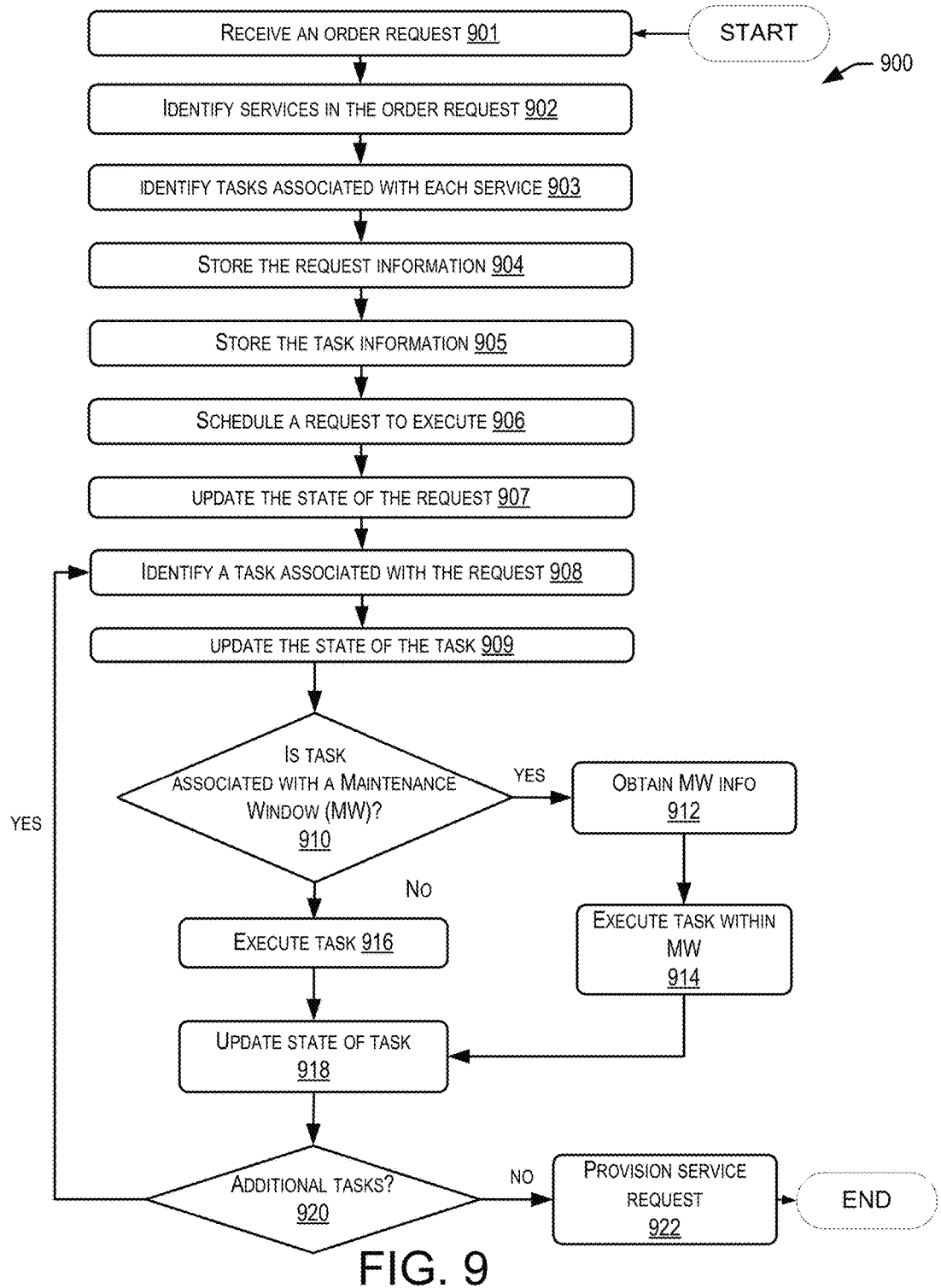
FIG. 9 illustrates a flow diagram of a process for processing and scheduling service requests by the SDI module, in accordance with an embodiment.

FIG. 9 illustrates a flow diagram of an example process 900 for processing service requests by a SDI module (e.g., SDI module 806). The process at 900 may begin at step 901 when an order request is received by SDI module from TAS module 309. At step 902, SDI module identifies one or more services from the order request. The order request can be parsed to obtain one or more identifiers associated with a specific service or to obtain service commands directly. The SDI module can also infer certain services from an order request. For example, an order request may request a subscription for services, resources, a combination of services/resources, or an identified capability. The SDI module can, via a lookup table or rule, determine one or more services to enable the subscription. The services can include services to provision one or more resources.

At step 903, the SDI module can identify one or more tasks associated with each service. Tasks can be identified by parsing each service and/or through use of a rule or lookup table. Each task can be an atomic operation to perform a task. For example, a task can include provisioning of a specific service. Additionally, an order of tasks can be determined for the service. For example, several resources can be provisioned sequentially. A first resource may be provisioned prior to a second resource in order to, for example, avoid violating dependencies between tasks.

At step 904, request information can be stored in request/task data store 318. At step 905, task information can be stored in request/task data store 318. Request/task data store 318 can include one or more data structures or memory organizations that associate a request with corresponding task information. Request/task data store 318 can, for example, include a queue for processing requests and tasks. Each request and/or task can be associated within request/task data store 318 with a status identifier.

At step 906, the SDI module can schedule a request to be executed. The SDI module can, for example, retrieve request information from request/task data store 318. The SDI module can use state information associated with each request when scheduling the requests. For example, a paused request may be prevented from being scheduled for execution until the request's state no longer indicates that the request is paused. Requests within request/task data store 318 can be scheduled sequentially (e.g., in the order that they were inserted into request/task data store 318) or non-sequentially. Information associated with each request can be used to schedule requests within a certain time period. For example, a time period can correspond to a cyclic processing window wherein the SDI module processes requests or tasks. Request can be scheduled within a processing window depending on how many dependencies are identified in a request, historic information, expected time of completion, etc.

At step 907, a state of a request can be updated. For example, a state can be updated to indicate that a request is being processed. At step 908, a task (such as from a plurality of tasks associated with the request) can identified. At step 909, and the state of the task can be updated to indicate, for example, that the task is being processed. At step 910, SDI module can determine if the task is associated with a MW. A task can be identified with a maintenance window if, for example, the task is identified as requiring a specific maintenance window wherein certain other tasks or processes are not concurrently being processed, a reboot of a computer resource, device, or module is required for performing the task, a certain resource contention is determined, a specific error type is detected, etc. At step 912, if the task is associated with an MW, then the MW information can be obtained from a stored list of scheduled maintenance windows, by determining a time period (e.g., a period of time taken by the task and any sub-tasks within the task to execute) wherein competing tasks are not scheduled, by creating a time window wherein competing tasks are not schedule by, for example, rescheduling competing tasks, etc. At step 914, the task can be scheduled to be executed within a determined MW.

At step 918, the state of the task can be updated to indicate that the task has been successful completed, erred, is to be retried, etc. If it is determined that there is no MW associated with the task, then the task can be executed immediately at step 916 and the state of the task can be updated at step 918. At step 920, it can be determined if there are additional tasks associated with the request. If there are additional tasks, then the process continues to step 908 to identify the next task. If there are no additional tasks identified for the request, then the request is provisioned at step 922 before an END step.

Figure 10:
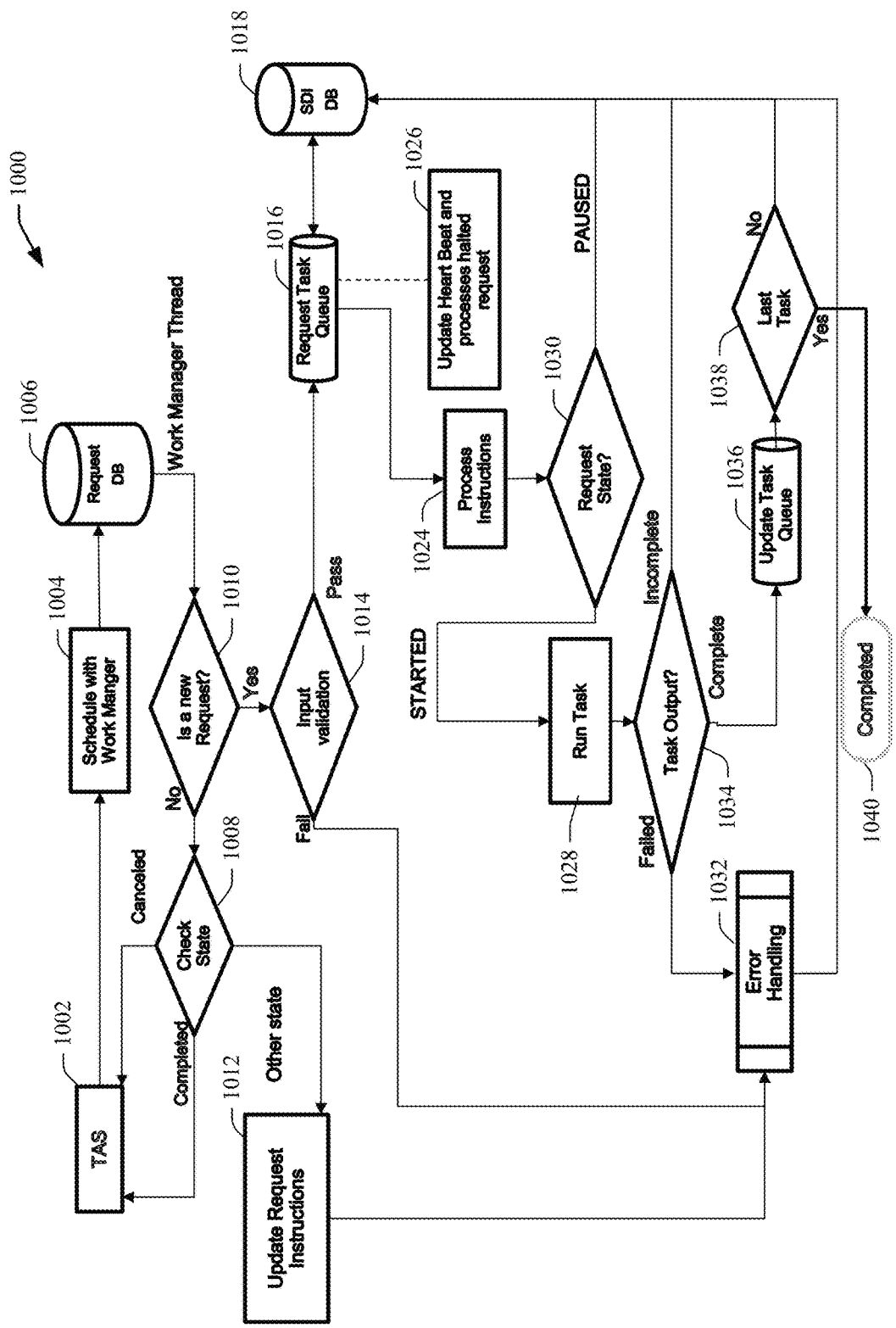
FIG. 10 illustrates a flow diagram of an example process for processing and scheduling service requests by the SDI module, in accordance with another embodiment.

FIG. 10 illustrates a flow diagram of an example process for processing and scheduling service requests by the SDI module, in accordance with another embodiment of the present invention. Process 1000 can begin at TAS module 1002. TAS module 1002 may be implemented as described in this disclosure, such as for TAS module 804 of FIG. 3.

TAS module 1002 can receive a request for a service provided by a cloud infrastructure system including TAS module 1002, an SDI module (blocks 1008-1040), an error handling module 1032, and/or one or more resources (not shown). The one or more resources can be provisioned to enable the service. Process 1000 includes various features related to provisioning of resources of the cloud infrastructure system to enable a service requested by a user. Provisioning of resources can include reserving the resources so that they are not occupied by a competing service or process of the cloud infrastructure system. For example, resources can include, without limitation hardware resources, virtualized resources, data storage resources, processing resources, communications resources, computing resources, electronic content, or an application. Furthermore, provisioning of resources can include separating the resource into a separate domain in order to prevent inadvertent access to the one or more resources by another user, task, or process. For example, the domain can be protected by validation protocols to prevent inadvertent access.

After a request for a service provided by the cloud infrastructure is received, the request can be scheduled by work manager 1004. The scheduling of the requests can occur in the order in which they were requested, in another order, at a set frequency, at set or variable intervals, concurrently, or in any combination of the preceding. After the requests are scheduled, they can be stored within request database 1006. The work manager can then proceed to process requests from request database 1006. As each request is further processed, a determination 1010 can be made if the request is a new request or has previously been processed by the cloud infrastructure system. This can occur, for example, when a certain request has exited process 1000 and assigned state that requires further processing. As one example, a request can be paused, returned to request database 1006, and then later un-paused so that processing can continue. As another example, a request can delayed until an appropriate MW is available for the request.

If it is determined that a request is not a new request, a determination 1008 can be made as to the state of the request. If it is determined that the state of the request is canceled or completed, for example, the request can be returned to the TAS module 1002 as these statuses can indicate that no further processing may need to be performed on the request. In such a scenario, indicators of completed requests and/or pointers to provisioned resources can be returned. If, however, the status indicates that the request is in a state other than completed or canceled, then additional instructions associated with the request may need to be updated 1012. These instructions can, for example, be included within request database 1006 for further processing, can be forwarded to process instructions module 1024, and/or can otherwise be stored within the cloud infrastructure system. A state of a request could also indicate that an error has been identified for the request. If such a determination is made, a request can be forwarded to error handling module 1032 for further processing, as will be disclosed herein.

At input validation decision module 1014, a determination can be made as to whether a request contains valid input. Input validation decision module 1014 can be entered via module 1010 if a determination is made that a request is a new request. If input validation fails for a request, the request can be forwarded to error handling module 1032 for further processing. A request can fail input validation for various reasons. For example, the request can be improperly formatted, contain invalid data, can be incomplete, or can otherwise not accord to various rules of cloud infrastructure system for determination of valid input. If, however, a request is found to contain valid input, it can proceed to request task queue 1016.

Request task queue 1016 can include logic to determine tasks associated with a request for a service in a number of ways. For example, a request for a service can be associated with a service request type. The service request type can be associated with a defined set of tasks for performance of the request. Some of the tasks can include provisioning one or more resources of the cloud infrastructure system. Other tasks can include movement of data, configuration of a cloud infrastructure module, processing of tasks, or other operations associated with the cloud infrastructure system. Another method for determining an order for a listing of tasks associated with a request can be determined from the request itself. For example, a request for a service can comprise a data field with specific instructions for ordering or identification of tasks. Yet another method for determining tasks to perform a request can be to identify a code that may be embedded or otherwise associated with a request for a service of the cloud infrastructure. The code can identify the identity or order of the tasks.

Request task queue 1016 can interact with SDI database 1018 to store and/or access tasks. SDI database 1018 can be used to store tasks as well as an associated current state of each of various tasks that are currently in process by the SDI. Furthermore, SDI database 1018 can be used for scheduling purposes, such as by storing timing information associated with each task such as when a task is delayed. Request task queue 1016 can also interact with heartbeat and process halted request operation module 1026. Update heartbeat and process halted request module 1026 can be used for scheduling of processing of tasks. For example, a heartbeat can be used to cyclically process tasks at set or other intervals. A heartbeat can be a signal or indicator transmitted periodically transmitted between two entities. If the signal fails to change state at intervals, then a system can be inferred to have encountered an error preventing updating of the heartbeat signal or indicator change. The heartbeat can also be used to synchronize various modules within the SDI or otherwise in the cloud infrastructure. Heartbeat can also be used to change timing associated with processing of tasks or throttle tasks according to statues of the SDI. As one example, a halted request can be used to alter a heartbeat or other signal and indicate that the SDI should either stop or prevent new tasks from being processed.

Furthermore, several tasks can be processed within a single period of a change of state of a heartbeat signal. Various methods can be used to choose various tasks for processing within a specific cycle. For example, a round-robin approach can be used wherein each task has equal priority. However, it should be understood that not all tasks or requests may require the same amount of time or processing resources for completion. Therefore, an equal priority selection schema may not efficiently load resources of the cloud infrastructure system. In order to more efficiently schedule and process tasks and/or requests, other selection criteria can be used. For example, a determination can be made as to a length of time required to process one or more tasks. As one example, it may be determined that a task is dependent upon other tasks. These other tasks can be associated with a different request than the current task. If a determination is made that no dependencies exist for tasks of a particular request, that particular request may be assigned a higher priority than other requests for which dependencies are identified.

Other methods can be used to assign weights and/or otherwise assign different priorities for processing different tasks and/or requests. For example, a task type or a request type can be associated with each task or request. The task type can be used to determine the relative amount of time and/or resources required to process a specific task or request. This determination can be made through analysis, by analyzing historical data, or otherwise. Furthermore, each task or request can have associated data indicating an amount of time or an amount of resources needed to perform a task or resource. For example, a field could be embedded within a task or request. It should be understood the various other techniques can be used for determination of a weight assigned to a task or request for use when scheduling the task or request for further processing and the provided examples are non-limiting.

When determining which tasks or request are be scheduled or processed within a cycle, the weights can be used to optimize the number of tasks currently in flight through SDI modules. As one example, a single cycle can contain only one request that is known to require a relatively large amount of processing to complete the request. Alternatively, a single cycle can contain many smaller tasks or requests that may require relatively little processing to complete the task. Furthermore, the cycle itself can be adjusted to accommodate various numbers of tasks and/or requests. For example, the system can implement a dynamic heartbeat that can be adjusted based upon a current state of the SDI. As one example, various feedback information obtained from different points along the SDI processing pipeline can be used to detect a current state of loading of the SDI. If the SDI is relatively unloaded, the heart beat frequency can be increased to allow more requests or task to be processed. Alternatively, if the pipeline is relatively heavily loaded, the heartbeat can be slowed to allow fewer tasks or request through the pipeline.

As tasks are issued by the request task you 1016 they can proceed to process instructions module 1024. Process instructions module 1024 can be used to parse and/or follow various instructions that may be associated with one or more tasks. These instructions can be assigned by update request instructions 1012, can be input by user, can be modified by the cloud infrastructure system, or can otherwise be provided with various tasks. These instructions can include timing information for performance of tasks. For example, the timing instructions can indicate a timing window or a maintenance window for performance of various tasks. The instructions can indicate various dependencies between tasks, can require certain tasks to be paused or otherwise have their states changed, can rearrange an order in which certain tasks are performed, or can otherwise alter rules of the cloud infrastructure regarding processing of tasks. After the instructions are processed, a state of each task can be determined 1030. If it is determined that the state of a task is paused, the task can be returned to SDI database 1018 for further processing.

If the state of the task indicates that the task is to be started, the task can proceed to run task module 1028. Run task module 1028 can proceed to process each task. As disclosed herein, a task can be associated with provisioning of a resource of the cloud infrastructure system to enable a service or can perform various other operations. These operations can be performed within run task module 1028. After a task is processed via run task module 1028, a task output can be determined that indicates a result from processing a task. A determination of the task output 1034 can be made to determine whether a specific task has failed, has completed, or is incomplete. If the task has failed, the task can be forwarded to error handling module 1032. If a task is incomplete, the task can be forwarded to SDI database 1018 for further processing. One example of a task being incomplete is if a task from which it depends has not yet been completed. For this example, the task can be forwarded to the database so that it can be processed when the task from which it depends has completed. Furthermore, instructions can be associated with a task to indicate one or more dependencies to be processed by process instructions module 1024, for example. If the task output indicates that the task has completed, a task queue can be updated 1036. This updating can include updating a status of the task within the queue so that further processing of the task is not attempted. The task queue can be the same queue associated with request task queue 1016 and can be stored in, for example, SDI database 1018. Next, a determination can be made as to if the task is a last task within a request. If it is the last task, then the process can complete 1040, and the request can be reported as having been completed to TAS module 1002. If the task is not a last task for a request, then the task can be forwarded to SDI database 1018 for further processing.

FIGS. 11A-D illustrates a flow diagram of an example process 1100 by which an SDI module performs error recovery for request processing, in accordance with an embodiment of the present invention. The SDI module can be an SDI module as described within this disclosure. Process 1100 can begin by determining an error type at step 1102. An error type can be determined in various ways. An error types can be information indicating a type of error during processing or provisioning of a service or task. For example, an error type can be determined when a resource of a cloud infrastructure system cannot be communicated with by the SDI. Furthermore, an error type can be assigned when a resource provides invalid or improperly formatted data. Such a condition can occur when a communication link between the SDI and the resource is unstable, such as when a communications connector is loose or there is electromagnetic interference. Another error type can indicate that an invalid response is received from a resource. Such an error can indicate that the resource may be faulty. Still other error types can indicates that prerequisite operation has not been completed for a specific task. Such a prerequisite operation can include setting up a group of resources, processing another task, waiting until a specific time, or any other condition indicating that the cloud infrastructure is not currently able to process a request or a task for providing a service.

An error type can also be communicated by a resource manager providing one or more resources. For example, a resource manager can be associated with a set of databases within the cloud infrastructure. A database resource manager can manage allocation of databases for provisioning. The SDI can request a database resource from a database resource manager to enable a service. If the database resource manager fails to provision a database or otherwise detects an error with provisioning a database, the database resource manager can communicate an error code to the SDI. The SDI can then interpret the error code to determine an error type.

Further non-limiting examples of error types can include an error type indicating that a specific resource has insufficient capacity. For example, given the example of a database resource being requested by a task, a certain amount of database memory could be requested to enable a specific service. If it is determined that the resource does not have sufficient capacity to enable the task, a specific error type can indicate that the resource has insufficient capacity. Another example error type can indicate that a resource has already been provisioned to enable another service, for example. Such a condition can exist when several tasks are being processed by the cloud infrastructure system concurrently. Timing collisions can occur when a specific resource is requested by a first task and a second task later attempts to provision the same resource. Still yet another error type can indicate that a portion of a database or other memory construct that is already reserved for another task is requested by a task. For example, a first task can reserve a certain amount of database memory for future provisioning. A second task can then attempt to provision memory including the reserved database memory. For such a scenario, an error type can indicate that the requested memory is not available because the memory has been reserved. In such an instance, a determination can be made as to a priority between the tasks so that the reserved memory can be released for the new task or remain reserved for the preceding task.

Still other error types can indicate the use of the maintenance window features disclosed herein. For example, a certain maintenance window can be requested for executing one or more tasks, the maintenance window being of a requested length of time. If no maintenance window can be found meeting the requested length of time, then an error type can be indicated. Still other error types can be associated with various configurations, properties, and/or parsing of tasks, instructions, or requests.

At step 1104, Process 1100 can then determine a resource type associated with one or more tasks. A resource type can be identified for a specific task. For example, each task or task type may be associated with provisioning of a specific resource type. In such a scenario, by determining a task type, a resource type can also be determined.

In some embodiments, a task can include various data fields that can be associated with a resource or resource type. For example, the task itself can indicate what resource is to be provisioned by embedding resource information within the task. A database can be used to associate various tasks and/or task identifiers with various resources for provisioning by each of the tasks. Using a database, a look up rule or table can be followed to determine specific resource type that is associated with one or more tasks. It should also be understood that a resource type can also be associated with a request for a service.

As yet another example, a resource manager can indicate a specific resource type. For example, a resource manager can manage more than one type of resource. A resource manager can manage various different types of memory pools such as solid state, random access, and mechanical hard disk drives. One or more tasks can attempt to provision one or more types of memory from that resource manager. If the resource manager determines a fault when provisioning one or more of the different memory types, the resource manager can communicate the memory type that has failed to provision to the SDI.

Various example resources can include databases, racks, external services, or virtual machines. A database can further be broken into a schema, a cluster database instance, or a single instance database. A cluster database instance can be a logical construct of multiple databases or database instances that are logically arranged as a group. This group can be arranged by having resources with like characteristics, being physically co-located, or in any other manner. By clustering databases, the databases can be easier managed by the cloud infrastructure system. Rules can be applied to groups of databases instead of to each individual database, for example.

A rack can be another example virtual construct of various resources within a cloud infrastructure system. A rack can contain memory, CPUs, server pools, or other devices or logical constructs within a cloud infrastructure system. An instance of a rack can be implemented as including a specific set of resources that can commonly be used to enable one or more services or service types. Racks can dynamically be altered or updated by the cloud infrastructure as needed to meet the various demands of the services of the cloud infrastructure system. By defining racks, provisioning of resources can be simplified. For example, a task can request a rack type in place of a set of tasks that each request provisioning of a resource of a rack. Racks can include variously defined network domains of resources such as, a subnet, gateway, or a server pool.

External resources can include various resources external to the cloud infrastructure system. For example, various hosts or subnets can be interfaced via the cloud infrastructure system to provide specialized needs or additional capacity to the cloud infrastructure system. Still other specialized resources can also be defined within the cloud infrastructure system. For example, a virus scanning resource can be embedded within the cloud infrastructure system that they can be requested by one or more tasks determine if a virus exists within a requested resource prior to enabling a service. Furthermore, a virus scanning utility can be requested as part of a service to continually enable virus scanning after the service is enabled. Likewise, a notification system can be embedded within a cloud infrastructure system to enable notification functionality for a given service. For example, user can be notified where there is an error or a predefined result user may request. Still yet another example is a global monitoring database. Such a database can be used to provide monitoring functionality for a service. The monitoring functionality can enable the service owner to debug or otherwise have insight into the functionality of the service in order to detect or correct errors, update resources as needed, collect information from a service or portion of the service.

At step 1106, after an error type and resource type are determined, a determination can be made if a non-recoverable error has occurred. At step 1114, if a non-recoverable error has occurred, various rules can be implemented to determine an appropriate action, such as reporting of the error. Reporting of an error can include reporting a message to an entity of a computer in an infrastructure, displaying an error message on a display for a user to review, sending a message to a personal device of a user, etc. For example, a non-recoverable error could be determined when a resource has failed to function properly or cannot be communicated with. In such an instance, a task requesting the failed resource may be returned or otherwise associated with a non-recoverable error indicator. Still other examples of non-recoverable errors can include invalidly formatted tasks or requests, detection of an unknown error, a resource request exceeding defined limits, or other errors. If at non-recoverable error is detected, then no additional error handling processes may need be initiated, such as a retry, rollback, scheduling of a maintenance window, or delaying of a task. Instead, the faulted task or request can be reported to a user so that the user can take appropriate action to correct the faulted task, request, or cloud infrastructure resource.

At step 1108, a determination can be made if the error type or resource type indicates retrying a task or request. For example, a communication error between the SDI and a resource can be interpreted through the use of a rule that had retry of the task should be attempted. For example, a communication error can occur when the network is too congested. By automatically implementing rules that allow retrying of provisioning resources of tasks, processor overhead can be avoided. It should be understood that there are many instances in which retrying a task may be desirable. For example, retrying a task or request can be a default rule for any error detected. As another example, after a request for a service is rolled back, a retry may be attempted for the request. Such a technique may be desirable for the previously given example involving the use of defined racks each tailored for a service or service type. If a determination is made that the error type or resource type indicates retrying a task or request, then, at step 1116, Retry error handling procedure(s) can be performed.

At step 1110, a determination can be made if a task should be delayed. Such a delay can be indicated by a user or through various rules of a cloud (or other computing) infrastructure system. As one example, the maintenance window disclosed herein can be an example of delaying one or more tasks until an appropriate maintenance window is available. As another example, a communication error can be associated with a delayed response. In this manner, a task can be retried after a certain delay when the resource may become available or a communication link less congested, for example. At step 1118, if it is determined that a task should be delayed, then delay error handling procedures can be performed.

At step 1112, determination can be made if the error type and/or resource type indicates that a rollback is desired. A rollback may be desirable when a task fails within a request requiring resources provisioned by other tasks in the request to be released. For example, a task may request a resource that may not be able to be provisioned. In such a scenario, the status of the remaining resources for provisioning the request of the task could be unknown, leaving the system in an unknown state. It may therefore be desirable to rollback the entire request, including all resources already provisioned for the request, so that the system can be left in a known state. As one example, the cloud infrastructure can include a plurality of racks and each of the racks may contain resources for provisioning a specific type of service.

If a request for a service includes provisioning one of the plurality of racks and a resource of the rack fails to be provisioned, then the remaining resources of the rack may still be provisioned. Because, in this scenario, the rack is configured with only the resources necessary to provision the service type, the service cannot be provisioned by the rack if one of the resources fails to be provisioned. Therefore, it may be beneficial to rollback the entire request and release all of the resources of the rack. Then, the rack can be disbanded or disassociated and a new resource brought in to replace the failed resource. At step 1120, if it is determined that the error type and/or resource type indicates that a rollback is desired, than rollback error handling procedure(s) can be performed.

Figure 11A:
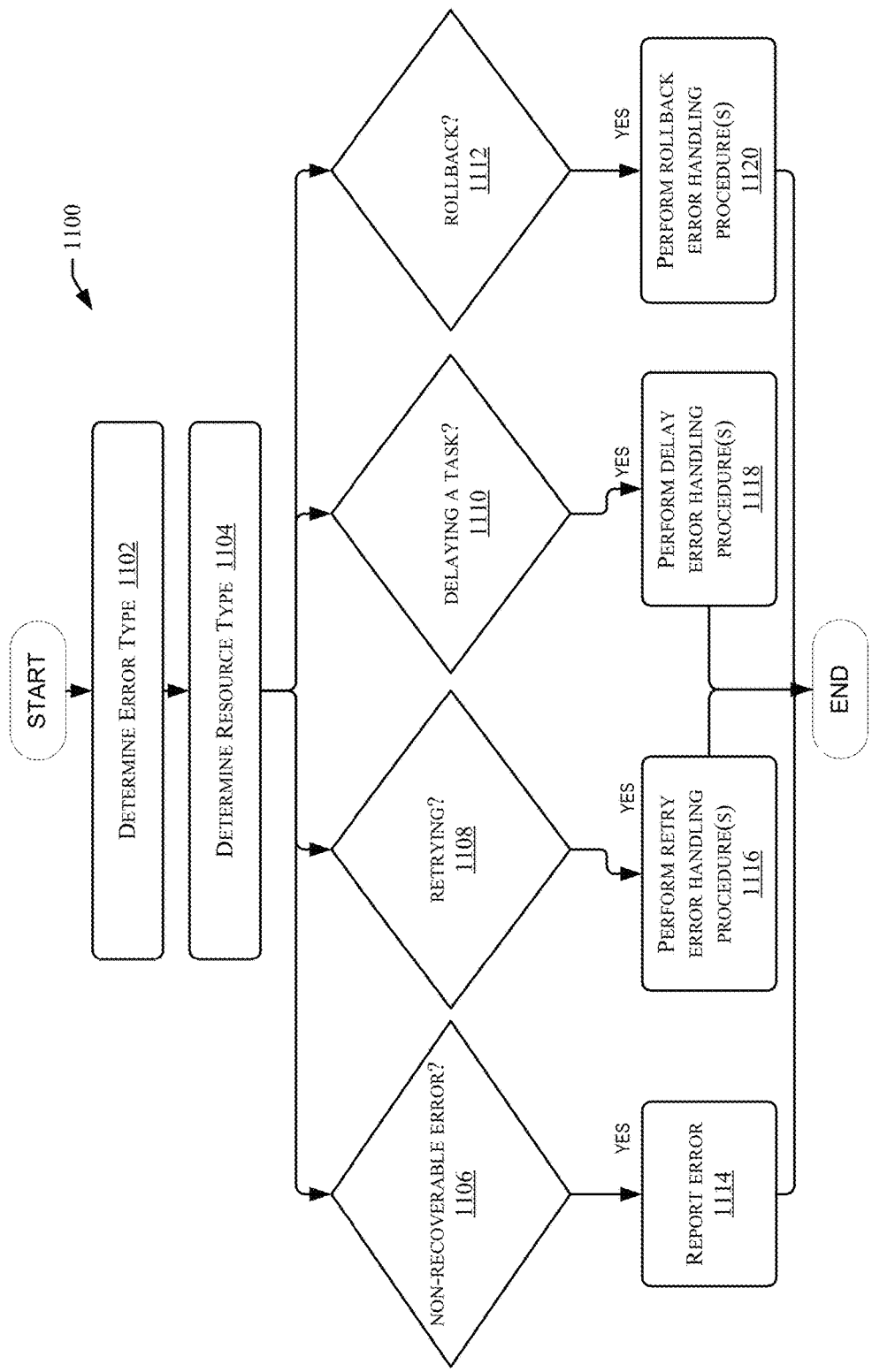
FIGS. 11A-D illustrates a flow diagram of an example process by which the SDI module performs error recovery while processing requests, in accordance with an embodiment.
Figure 11B:
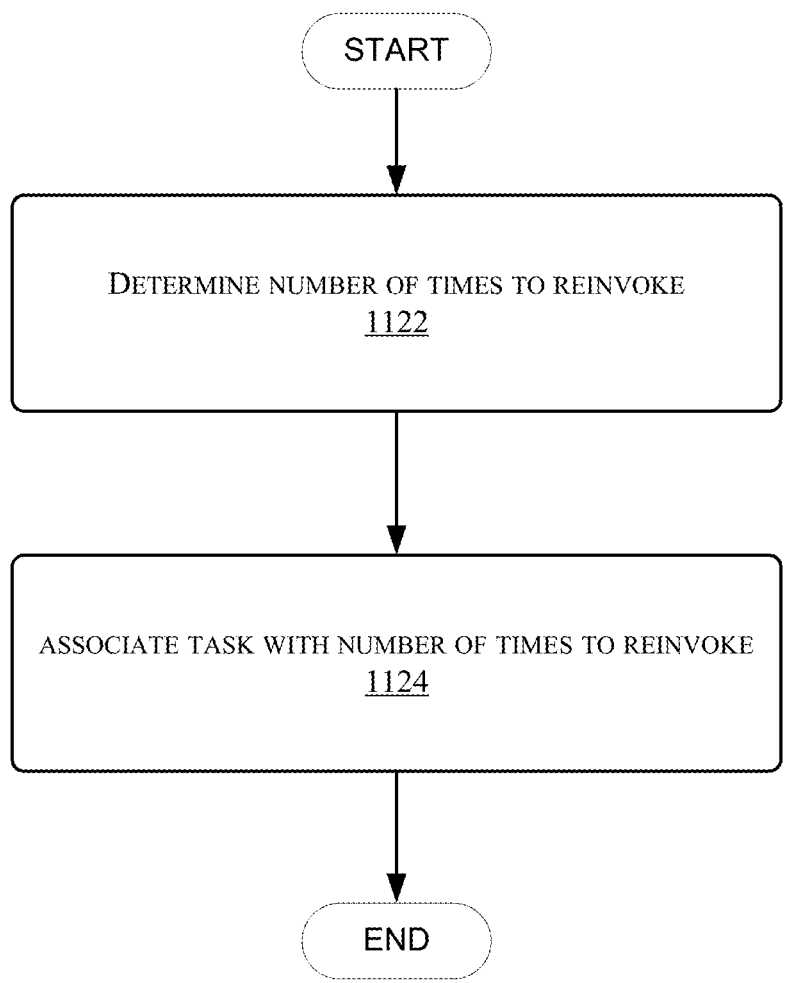

FIG. 11B illustrates a flowchart that can include steps for performing retry error handling procedure(s), such as at step 1116. Retry error handling procedure(s) can include reinvoking a task that can include reprovisioning one or more resources. At step 1122, depending on the error type, resource type, and/or task/request type, a number of times to attempt reinvokation can be determined. For example, a communication error can indicate that three reinvokations are warranted. Otherwise, a heavily utilized/congested resource can indicate a higher number of reinvokations. The number of reinvokations can be statically determined by rules, can be stored in a database, can be indicated by a specific task or request, or can otherwise be defined within the cloud infrastructure system. The number of reinvokations can also dynamically be determined through historical information by analyzing various characteristics of the cloud infrastructure system. For example, historical information can be stored regarding a number of reinvokations required to successfully provision a specific resource, task, or request. Using this information, the number of reinvokations can be optimized for various different scenarios. As yet another example, various resources can become more or less congested at different times of the day. Therefore the time of day can play a role in determining a number of times to attempt reinvokation of a request. At step 1124, the number of times can be associated with the task. The cloud infrastructure can then proceed to attempt to retry processing of the task for the number of times associate the task.

Figure 11C:
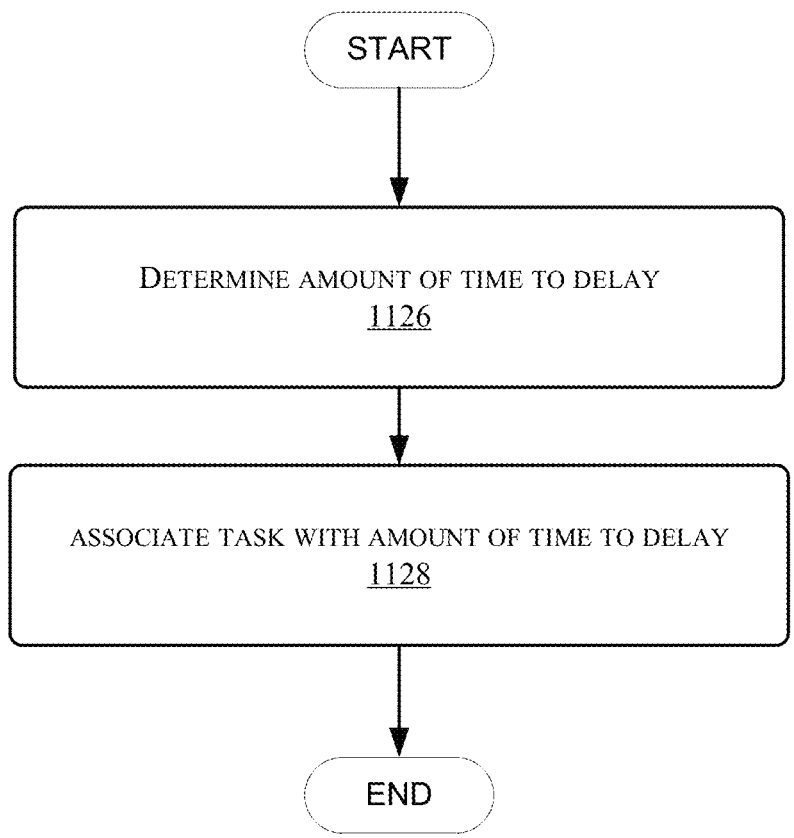

FIG. 11C illustrates a flowchart that can include steps for performing delay error handling procedure(s), such as at step 1118. Similar to the techniques described for determining a number of times to reinvoke a task, an amount of time to delay a task can be determined 1126 through various techniques including analysis of state information of a cloud infrastructure system, for example. The amount of time can be based on a service, service type, error type, resource type, and/or resource. The amount of time can be statically or dynamically assigned using rules, historical information, statistics, or other information. Furthermore, an amount of time to delay can be dynamically assigned using historic or other information. At 1128, after the time delay is determined, the time delay can be associated with a task.

Figure 11D:
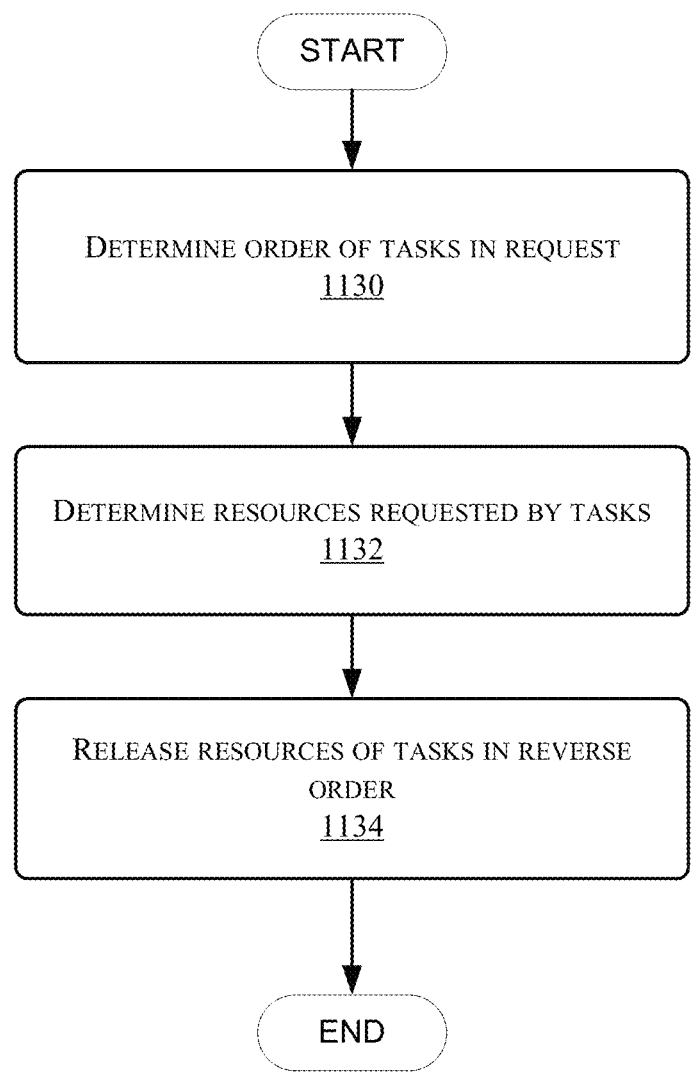

FIG. 11D illustrates a flowchart that can include steps for performing rollback error handling procedure(s), such as at step 1120. At step 1130, rolling back of a request for provisioning can include determining an order of tasks of a request. The order of the tasks can be used to mitigate issues associated with dependencies between tasks. These dependencies may not be known at the onset of provisioning the request (or even during or after provisioning). One technique of ensuring that such dependencies are not violated when rolling back can include determining an order of tasks for a request. At step 1132, the resources requested by each of the tasks for the request can be determined, including determining the resources requested by the tasks in the determined order. At step 1134, the resources can be released by following the order of the tasks in reverse order to which they were provisioned. By following the order in reverse, dependency violations can be avoided. In another example, dependencies may be known to the SDI. For example, a user can enter the dependencies, the dependencies can be detected in real time, and/or dependencies can be specified for a given task or task type. In such an instance, the SDI may have more freedom when releasing resources for a given service request. For example, if no dependencies are detected between tasks, resources of the tasks can be released concurrently. The term "release," as used herein is used to indicate that a resource is made available so that it is no longer associated with a specific task and can be provisioned to enable another service.

It should be understood that the various different error handling processes disclosed herein including rollback, retrying, and delaying are non-limiting and can be used in various combinations. For example, a specific task can be delayed and retried. Depending on different error types, resource types, task types, request types, or various other information, the specific number of retries and time delays can be adjusted to fit various different scenarios and optimize error handling processes of the cloud infrastructure system. By optimizing the error handling processes of the cloud infrastructure system, the resources of the cloud infrastructure system dedicated to handling errors can be configured to utilize the minimum number of resources of the system for a maximum advantage. This advantage can take the form of minimizing user interaction, minimizing the number of times that a task or request has to be reprocessed through a pipeline, maximizing the percentage of successfully provisioned resources, or other.

Figure 12:
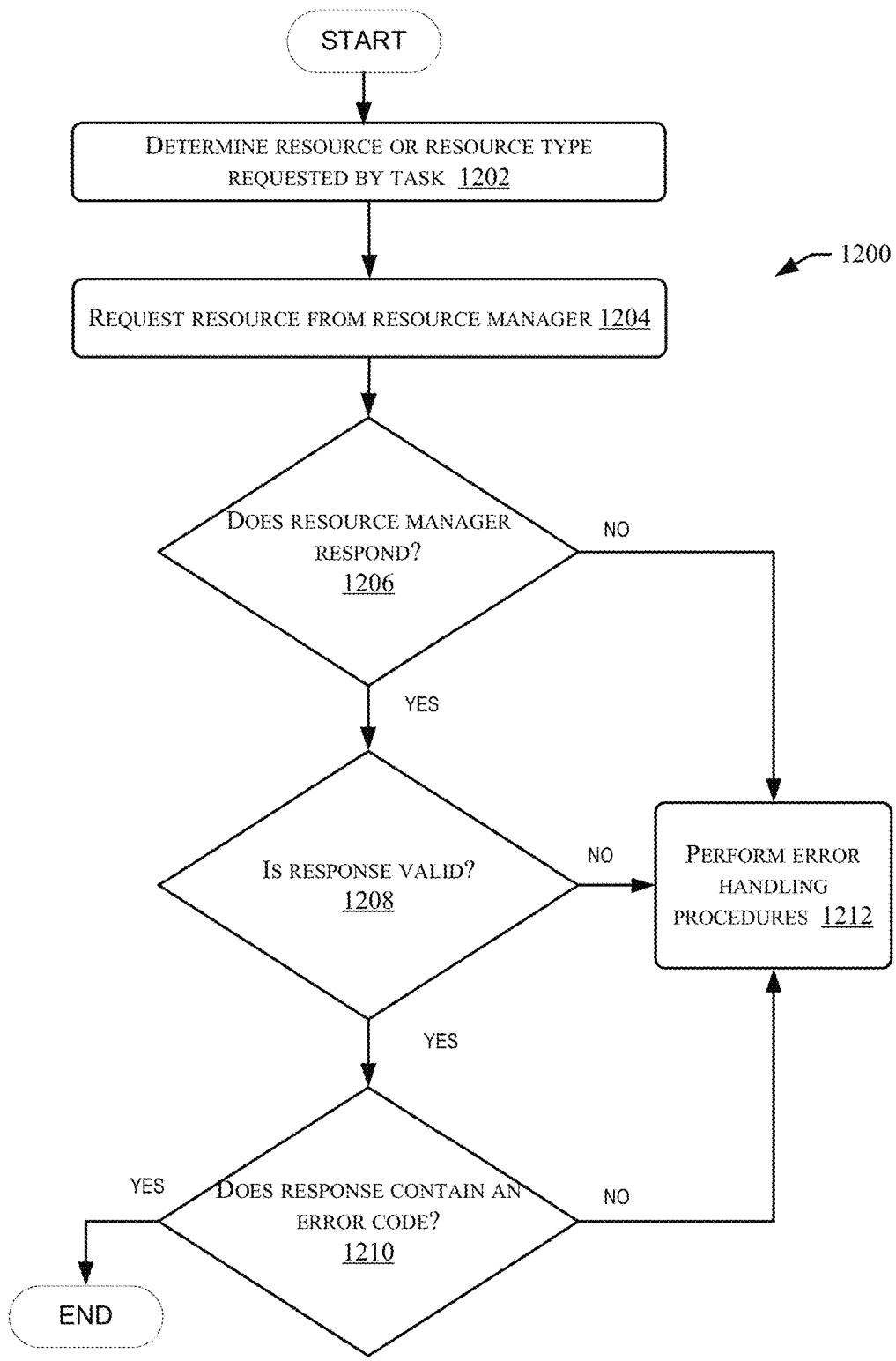
FIG. 12 illustrates a flow diagram of an example process by which the SDI module performs error recovery while processing requests, in accordance with an embodiment.

FIG. 12 illustrates a flow diagram of an example process 1200 by which the SDI module performs error recovery while processing requests, in accordance with an embodiment of the present invention. At step 1202, process 1200 begins by determining a resource or resource type requested by a task. The resource type can be embedded within the task, or can be associated with specific task or task type. For example, a task type can be assigned for a specific resource requested by all tasks of the task type. Otherwise, task type can contain a code indicating resource type, a task can include a destination address associated with a resource in the resource type determined by the destination address, or other techniques can be used to determine the resource type. As disclosed herein, a resource can be associated with a resource manager. The resource manager can act as a gatekeeper for the various resources. In this manner, in SDI module may not directly request resources within the cloud infrastructure, but may instead request the one or more resources from the associated resource manager. The resource manager can be configured to selectively provision the resources under its purview according to various rules or conditions. For example, resource manager can be optimized to reduce power consumption my a given set of resources by load leveling resources provisioned for services. Otherwise, resource manager can be a gatekeeper to an external or other domain wherein security concerns can be mitigated through the use of the resource manager. In other words, the resource manager can manage access rules between the various domains. This may occur if the resource manager manages resources that are external to the cloud infrastructure system, for example.

Because of this example topology of an SDI module not being able to directly interface with a resource without first going through a resource manager, an SDI module may not be able to determine an error by directly communication with a resource. Therefore, the resource manager can become a component within the error handling infrastructure of the cloud infrastructure system. At step 1204, a resource can be requested from a resource manager. At step 1206, a determination can be made if the resource manager responds to a request by an SDI module. If the resource manager does not respond, various error handling processes including retry and delay may be attempted. Furthermore, error handling procedures can include requesting resources from an alternative resource or resource manager associated with the requested resource type. At step 1208, Determination can also be made if a resource manager is providing a valid response. If the resource manager does not provide a valid response, it may indicate that the resource manager is faulty cannot be relied upon to provide a valid resource for provisioning a service. Therefore, the SDI module can also implement a flagging routine where the resource manager can be flagged as faulty and no longer be relied upon for provisioning.

At step 1210, a resource manager can provide one or more error codes to SDI module. The error codes can indicate various errors related to resources that the resource manager is managing, or to the resource manager itself. For example, an error code can indicate that resources managed by the resource manager are currently at capacity. For such an error code, SDI module may attempt to provision the resource again after a delay and/or retry. Alternatively, the resource manager itself may attempt one or more error handling processes itself prior to reporting to SDI module. For example, the resource manager may attempt to retry provisioning of resources under its purview. In this manner, a resource manager can implement any of the error handling procedures disclosed herein with regards to SDI module. By distributing error handling procedures throughout the cloud infrastructure system, errors can be handled locally and their impacts minimized across the cloud infrastructure system. At step 1212, error handling procedures can be performed by, for example, an SDI module or resource manager. Error codes can also be used to determine a number of retries and/or a time to delay a task or a service request. Error codes can also be used to determine whether a rollback is warranted.

Figure 13:
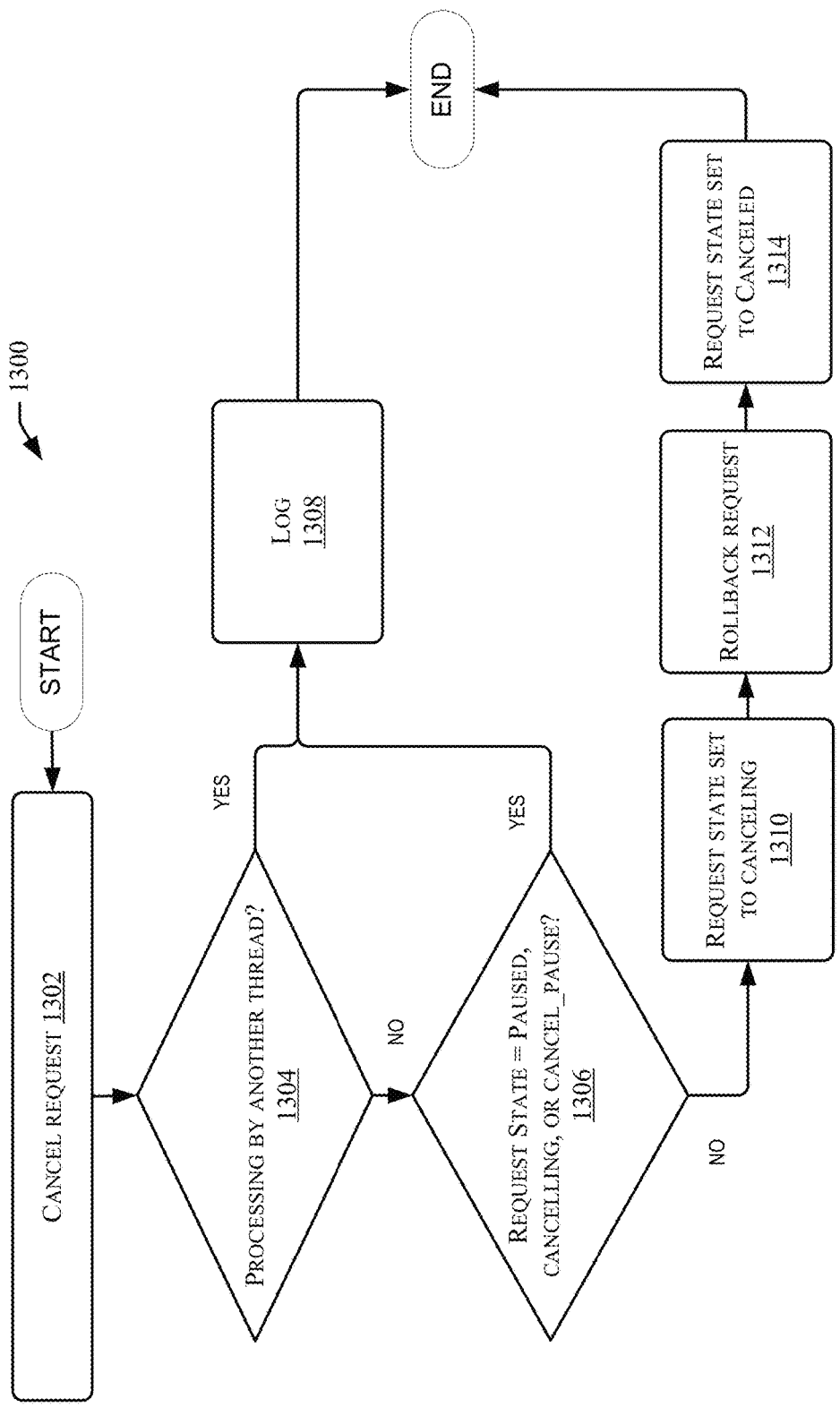
FIG. 13 illustrates a flow diagram for cancelling a request according to certain embodiments.

FIG. 13 illustrates a flowchart 1300 for cancelling a request according to certain embodiments. At step 1302, a request to cancel a service request can be received or a determination to cancel the service request can be made. For example, a service request can be cancelled in response to a determination that an error has been detected when attempting to provision resources for a task of the service request. At step 1304, a determination can be made if the request is being processed by another thread than the one processing the cancel request. At step 1308, if so, the attempt to process the cancel request can be logged. If not, then, at step 1306, a determination can be made of the state of the request indicates that the request is paused, currently cancelling, or paused during a cancel. If so, then the state can be logged for future processing, for example, when the paused state has expired. If not, then, at step 1310, the request's state can be set to cancelling to indicate that the request is currently being cancelled. At step 1312, a rollback request can be initiated. The rollback request can include undoing actions performed by tasks to provision a service request. For example, resources can be released in an order reverse to an order in which the tasks for provisioning were assigned. At step 1314, following a successful rollback, the request state can be set to canceled to indicate that the service has been cancelled.

Figure 14:
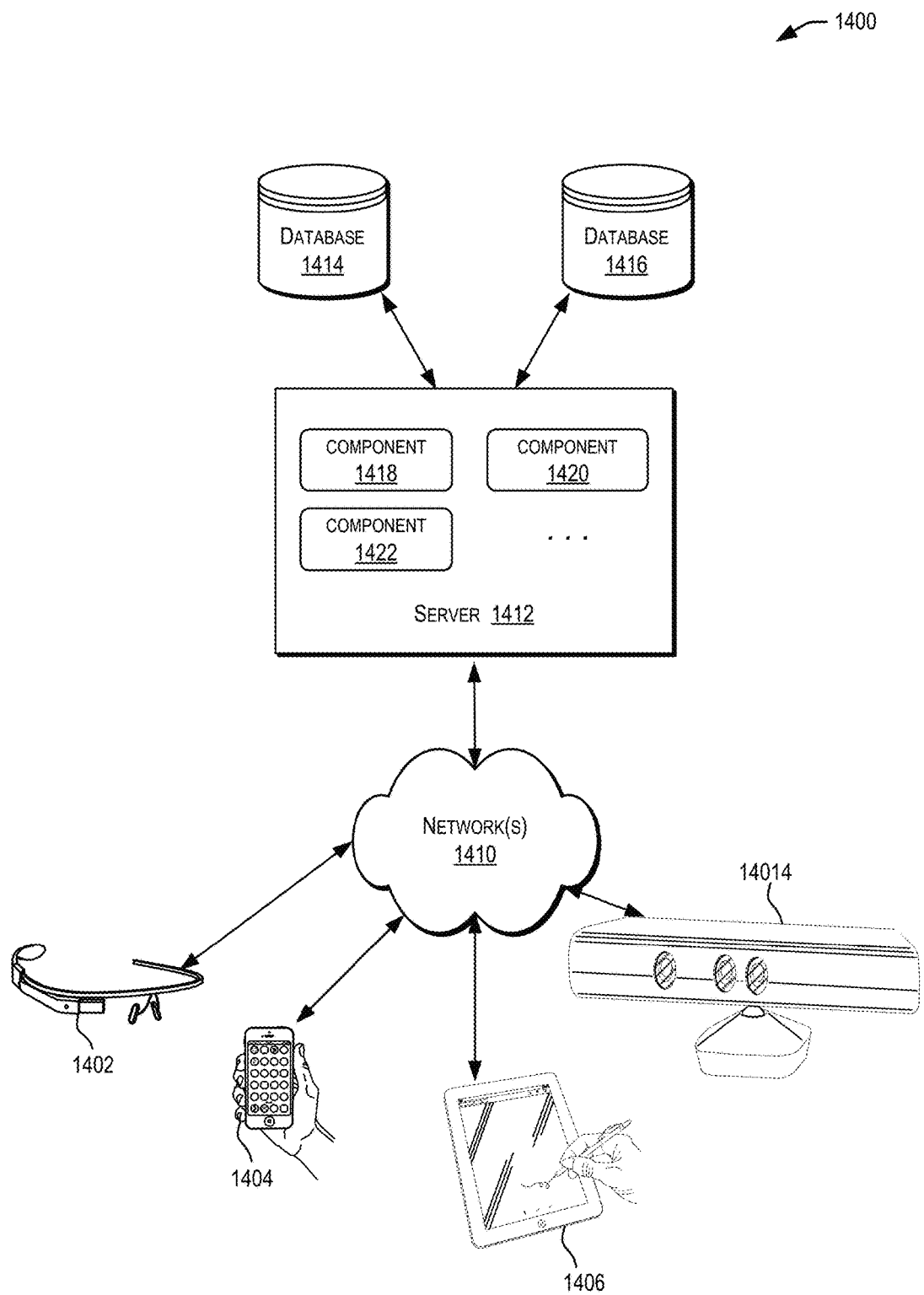
FIG. 14 depicts a simplified diagram of a distributed system for implementing an embodiment of the present disclosure.
Figure 15:
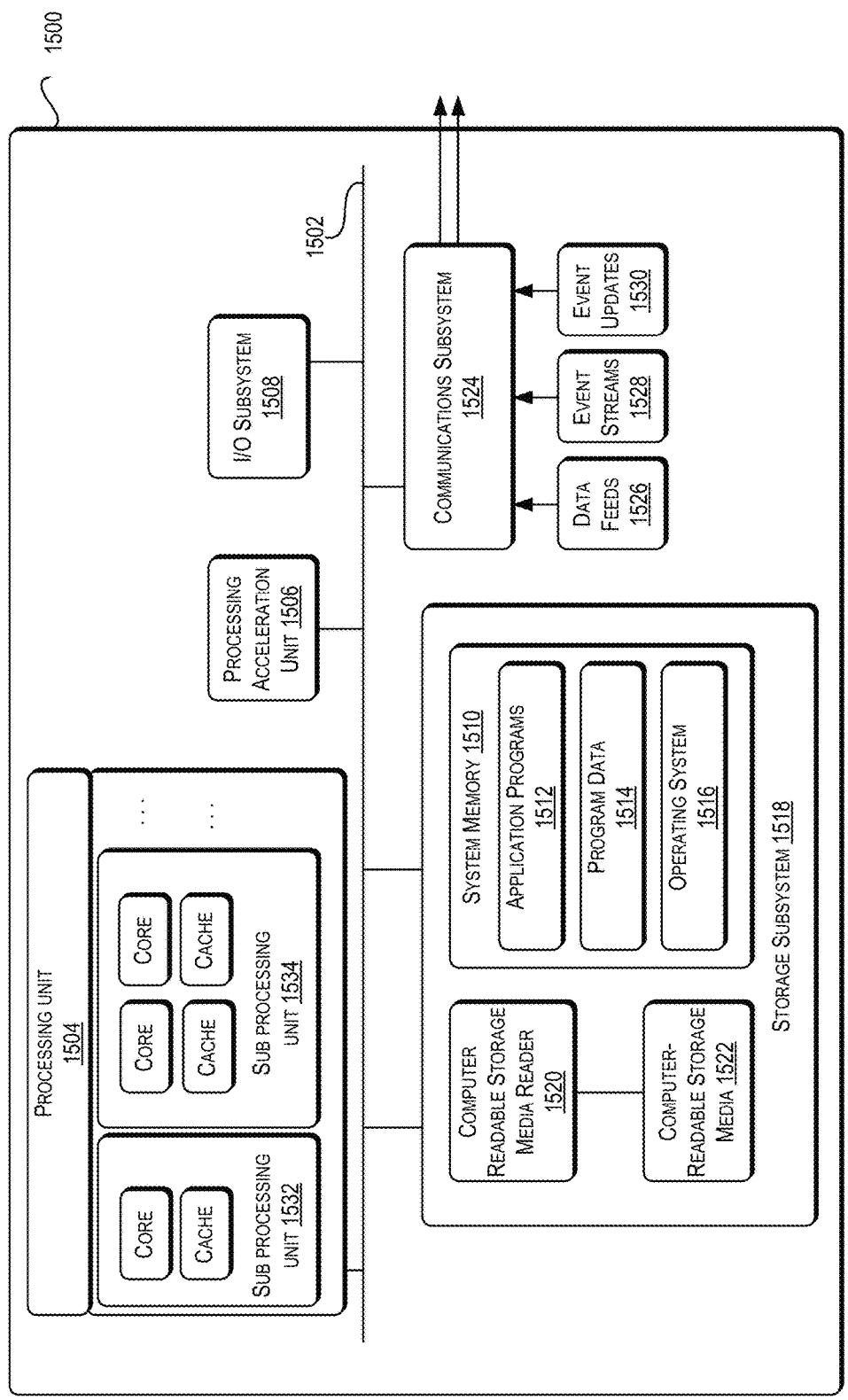
FIG. 15 illustrates an exemplary computer system that may be used to implement an embodiment.

FIGS. 14-15 illustrate aspects of example environments for implementing aspects of the present invention in accordance with various embodiments. FIG. 14 depicts a simplified diagram of a distributed system 1400 for implementing an embodiment of the present disclosure. In the illustrated embodiment, the distributed system 1400 includes one or more client computer devices 1402, 1404, 1406, and 1408, which are configured to execute and operate a client application such as a web browser, proprietary client (e.g., Oracle Forms), or the like over one or more network(s) 1410. The server 1412 may be communicatively coupled with the remote client computer devices 1402, 1404, 1406, and 1408 via network 1410.

In various embodiments, the server 1412 may be adapted to run one or more services or software applications such as services and applications that provide identity management services. In certain embodiments, the server 1412 may also provide other services or software applications can include non-virtual and virtual environments. In some embodiments, these services may be offered as web-based or cloud services or under a Software as a Service (SaaS) model to the users of the client computer devices 1402, 1404, 1406, and/or 1408. Users operating the client computer devices 1402, 1404, 1406, and/or 1408 may in turn utilize one or more client applications to interact with the server 1412 to utilize the services provided by these components.

In the configuration depicted in FIG. 14, the software components 1418, 1420 and 1422 of system 1400 are shown as being implemented on the server 1412. In other embodiments, one or more of the components of the system 1400 and/or the services provided by these components may also be implemented by one or more of the client computer devices 1402, 1404, 1406, and/or 1408. Users operating the client computer devices may then utilize one or more client applications to use the services provided by these components. These components may be implemented in hardware, firmware, software, or combinations thereof. It should be appreciated that various different system configurations are possible, which may be different from distributed system 1400. The embodiment shown in FIG. 14 is thus one example of a distributed system for implementing an embodiment system and is not intended to be limiting.

The client computer devices 1402, 1404, 1406, and/or 1408 may include various types of computer systems. For example, client device may include portable handheld devices (e.g., an iPhone®, cellular telephone, an iPad®, computer tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computer devices may also include general purpose personal computers including, by way of example, personal computers and/or laptop computers running various versions of Microsoft Windows®, Apple Macintosh®, and/or Linux operating systems. The client computer devices can be workstation computers running any of a variety of commercially-available UNIX® or UNIX-like operating systems, including without limitation the variety of GNU/Linux operating systems, such as for example, Google Chrome OS. Client computer devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1410.

Although distributed system 1400 in FIG. 14 is shown with four client computer devices, any number of client computer devices may be supported. Other devices, such as devices with sensors, etc., may interact with the server 1412.

The network(s) 1410 in the distributed system 1400 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1410 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1412 can include one or more virtual machines running virtual operating systems, or other computer architectures involving virtualization. One or more flexible pools of logical storage devices can be virtualized to maintain virtual storage devices for the server. Virtual networks can be controlled by the server 1412 using software defined networking. In various embodiments, the server 1412 may be adapted to run one or more services or software applications described in the foregoing disclosure. For example, the server 1412 may correspond to a server for performing processing as described above according to an embodiment of the present disclosure.

The server 1412 may run an operating system including any of those discussed above, as well as any commercially available server operating system. Server 109 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 1412 may include one or more applications to analyze and consolidate data feeds and/or event updates received from users of the client computer devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1412 may also include one or more applications to display the data feeds and/or real-time events via one or more display devices of the client computer devices 1402, 1404, 1406, and 1408.

The distributed system 1400 may also include one or more databases 1414 and 1416. These databases may provide a mechanism for storing information such as user identity information, and other information used by embodiments of the present invention. Databases 1414 and 1416 may reside in a variety of locations. By way of example, one or more of databases 1414 and 1416 may reside on a non-transitory storage medium local to (and/or resident in) the server 1412. Alternatively, the databases 1414 and 1416 may be remote from the server 1412 and in communication with the server 1412 via a network-based or dedicated connection. In one set of embodiments, the databases 1414 and 1416 may reside in a storage-area network (SAN). Similarly, any necessary files for performing the operations attributed to the server 1412 may be stored locally on the server 1412 and/or remotely, as appropriate. In one set of embodiments, the databases 1414 and 1416 may include relational databases, such as databases provided by Oracle, that are adapted to store, update, and retrieve data in response to SQL-formatted commands.

FIG. 15 illustrates an exemplary computer system 1500 that may be used to implement an embodiment of the present invention. In some embodiments, computer system 1500 may be used to implement any of the various servers and computer systems described above. As shown in FIG. 15, computer system 1500 includes various subsystems including a processing subsystem 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 may include tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1504 controls the operation of computer system 1500 and may comprise one or more processing units 1532, 1534, etc. A processing unit may include be one or more processors, including single core or multicore processors, one or more cores of processors, or combinations thereof. In some embodiments, processing subsystem 1504 can include one or more special purpose co-processors such as graphics processors, digital signal processors (DSPs), or the like. In some embodiments, some or all of the processing units of processing subsystem 1504 can be implemented using customized circuits, such as application specific integrated circuits (ASICs), or field programmable gate arrays (FPGAs).

In some embodiments, the processing units in processing subsystem 1504 can execute instructions stored in system memory 1510 or on computer readable storage media 1522. In various embodiments, the processing units can execute a variety of programs or code instructions and can maintain multiple concurrently executing programs or processes. At any given time, some or all of the program code to be executed can be resident in system memory 1510 and/or on computer-readable storage media 1510 including potentially on one or more storage devices. Through suitable programming, processing subsystem 1504 can provide various functionalities described above for dynamically modifying documents (e.g., webpages) responsive to usage patterns.

In certain embodiments, a processing acceleration unit 1506 may be provided for performing customized processing or for off-loading some of the processing performed by processing subsystem 1504 so as to accelerate the overall processing performed by computer system 1500.

I/O subsystem 1508 may include devices and mechanisms for inputting information to computer system 1500 and/or for outputting information from or via computer system 1500. In general, use of the term "input device" is intended to include all possible types of devices and mechanisms for inputting information to computer system 1500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1518 provides a repository or data store for storing information that is used by computer system 1500. Storage subsystem 1518 provides a tangible non-transitory computer-readable storage medium for storing the basic programming and data constructs that provide the functionality of some embodiments. Software (programs, code modules, instructions) that when executed by processing subsystem 1504 provide the functionality described above may be stored in storage subsystem 1518. The software may be executed by one or more processing units of processing subsystem 1504. Storage subsystem 1518 may also provide a repository for storing data used in accordance with the present invention.

Storage subsystem 1518 may include one or more non-transitory memory devices, including volatile and non-volatile memory devices. As shown in FIG. 15, storage subsystem 1518 includes a system memory 1510 and a computer-readable storage media 1522. System memory 1510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by processing subsystem 1504. In some implementations, system memory 1510 may include multiple different types of memory, such as static random access memory (SRAM) or dynamic random access memory (DRAM).

By way of example, and not limitation, as depicted in FIG. 15, system memory 1510 may store application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1522 may store programming and data constructs that provide the functionality of some embodiments. Software (programs, code modules, instructions) that when executed by processing subsystem 1504 a processor provide the functionality described above may be stored in storage subsystem 1518. By way of example, computer-readable storage media 1522 may include non-volatile memory such as a hard disk drive, a magnetic disk drive, an optical disk drive such as a CD ROM, DVD, a Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1522 may provide storage of computer-readable instructions, data structures, program modules, and other data for computer system 1500.

In certain embodiments, storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for storing computer-readable information.

In certain embodiments, computer system 1500 may provide support for executing one or more virtual machines. Computer system 1500 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1500. Accordingly, multiple operating systems may potentially be run concurrently by computer system 1500. Each virtual machine generally runs independently of the other virtual machines.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to establish a communication channel to one or more client devices via the Internet for receiving and sending information from and to the client devices. For example, the account management system 112 depicted in FIG. 1 may receive user login information including input related to a training word from client devices using communication subsystem 1524. Additionally, communication subsystem 1524 may be used to communicate notifications of successful logins or notifications to re-enter a password from the account management system 112 to the requesting users.

Communication subsystem 1524 may support both wired and/or wireless communication protocols. For example, in certain embodiments, communications subsystem 1524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

Communication subsystem 1524 can receive and transmit data in various forms. For example, in some embodiments, communications subsystem 1524 may receive input communication in the form of structured and/or unstructured data feeds 1526, event streams 1528, event updates 1530, and the like. For example, communications subsystem 1524 may be configured to receive (or send) data feeds 1526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1524 may be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computer tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1500 depicted in FIG. 15 is intended only as a specific example. Many other configurations having more or fewer components than the system depicted in FIG. 15 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A non-transitory computer readable medium storing computer-executable instructions that are executable by one or more processors, the computer-executable instructions comprising:
   instructions that cause the one or more processors to receive a first request for a service provided by a cloud infrastructure system;
   instructions that cause the one or more processors to determine a first process for provisioning the service, wherein the first process includes performing a first plurality of tasks for provisioning a plurality resources for the cloud infrastructure system to enable the service;
   instructions that cause the one or more processors to perform the first process, wherein performing the first process includes invoking each of the first plurality of tasks;
   instructions that cause the one or more processors to detect an error related to a first task of the first plurality of tasks;
   instructions that cause the one or more processors to identify a first error type of the error related to the first task, the first error type being one of a plurality of error types;
   instructions that cause the one or more processors to identify a first resource type of a resource for the first task related to the error, wherein the resource is one of the plurality of resources;
   instructions that cause the one or more processors to select a first error handling process from a plurality of error handling processes based upon an error policy of the cloud infrastructure system, wherein the first error handling process is selected according to the identified first error type and the identified first resource type, and wherein first error handling process is configured to reinvoke the first task for a threshold number of times, the threshold number of times selected from a plurality of different retry thresholds based on at least one of the first error type or the first resource type; and
   instructions that cause the one or more processors to initiate the selected first error handling process.

2. The non-transitory computer readable medium of claim 1, wherein the first plurality of tasks are invoked according to an order defined for the first process.

3. The non-transitory computer readable medium of claim 2, wherein an error handling process selectable based upon the error policy is a roll-back error handling process to release one or more resources provisioned by a task of the first plurality of tasks in an order reverse to the order defined for the first process.

4. The non-transitory computer readable medium of claim 3, wherein the computer-executable instructions further comprise:

instructions that cause the one or more processors to determine whether at least one of the first error type or the first resource type indicates that the error is a non-recoverable error;

instructions that cause the one or more processors to select a second error handling process as the roll-back error handling process;

instructions that cause the one or more processors to, upon determining that at least one of the first error type or the first resource type indicates that the error is not a non-recoverable error and the selected second error handling process is the rollback error handling process, selecting a retry error handling process, wherein the retry error handling process includes performing the first process to reinvoke each of the first plurality of tasks in the order defined for the first process.

5. The non-transitory computer readable medium of claim 4, wherein the first process is performed a threshold number of times based on at least one of the first error type or the first resource type.

6. The non-transitory computer readable medium of claim 1, wherein the first error handling process selected based upon the error policy is a retry error handling process, and wherein the retry error handling process includes reinvoking the first task to provision the resource.

7. The non-transitory computer readable medium of claim 1, wherein the computer-executable instructions further comprise:

instructions that cause the one or more processors to select a second error handling process;

wherein the second error handling process selected based upon the error policy is a delay error handling process, and wherein the delay error handling process includes delaying reinvoking of the provisioning of the resource.

8. The non-transitory computer readable medium of claim 7, wherein the computer-executable instructions further comprise:

instructions that cause the one or more processors to receive an indication from a resource manager associated with the resource, the indication signifying that the resource is not available for provisioning based on a determination that usage of a resource type of the resource has met a threshold; and wherein the delay error handling process is selected in response to receiving the indication, and wherein the delay error handling process includes delaying the provisioning of the resource, the delaying including preventing a request from being transmitted to the resource manager associated with the resource to provision the resource for a time period.

9. The non-transitory computer readable medium of claim 1, wherein the first error handling process selected based upon the error policy is a retry error handling process type.

10. The non-transitory computer readable medium of claim 1, wherein the computer-executable instructions further comprise:

instructions that cause the one or more processors to select a second error handling process according to the first error type and a second resource type, the second resource type being different from the first resource type.

11. The non-transitory computer readable medium of claim 1, wherein the computer-executable instructions further comprise:

instructions that cause the one or more processors to select a second error handling process according to a second error type and the first resource type, the second error type being different from the first error type.

12. The non-transitory computer readable medium of claim 1, wherein the computer-executable instructions further comprise:

instructions that cause the one or more processors to receive an error indicator from a resource manager associated with the resource, the error indicator including an error code indicative of a type of error associated with provisioning the resource by the resource manager; and wherein the first error handling process is further selected based on the error code.

13. The non-transitory computer readable medium of claim 1, wherein the first error handling process is further selected based on the first resource type and a previously identified resource type, the previously identified resource type associated with a previously identified error associated with a previous attempt to provision the resource.

14. The non-transitory computer readable medium of claim 1, wherein the first error handling process is further selected based on the first error type and a previously identified error type, the previously identified error type associated with a previously identified error associated with a previous attempt to provision the resource.

15. The non-transitory computer readable medium of claim 1, wherein the computer-executable instructions further comprise:

instructions that cause the one or more processors to receive a plurality of requests, each request of the plurality of requests for provisioning a service provided by the cloud infrastructure system;

instructions that cause the one or more processors to determine a process for provisioning one or more resources for each request of the plurality of requests;

instructions that cause the one or more processors to determine a set of requests in the plurality of requests to perform within a time period; and instructions that cause the one or more processors to initiate each request in the set of requests during the time period.

16. The non-transitory computer readable medium of claim 15, wherein the computer-executable instructions further comprise:

instructions that cause the one or more processors to determine the requests from the plurality of requests based on a request type associated with each of the plurality of requests.

17. The non-transitory computer readable medium of claim 1, wherein the computer-executable instructions further comprise:

instructions that cause the one or more processors to receive a second request for a second service provided by the cloud infrastructure system;

instructions that cause the one or more processors to determine a second process for provisioning the second service, wherein the second process includes performing a second plurality of tasks for provisioning the plurality resources for the cloud infrastructure system to enable the second service;

instructions that cause the one or more processors to perform the second process, wherein performing the second process includes invoking each of the second plurality of tasks;

instructions that cause the one or more processors to detect a second error related to a second task of the second plurality of tasks;

instructions that cause the one or more processors to identify a second error type of the second error related to the second task, the second error type being one of the plurality of error types;

instructions that cause the one or more processors to identify a second resource type of a resource for the second task related to the second error, wherein the resource is one of the plurality of resources;

instructions that cause the one or more processors to select a second error handling process based upon the error policy of the cloud infrastructure system, wherein the second error handling process is selected according to the identified second error type and the identified second resource type; and instructions that cause the one or more processors to initiate the selected second error handling process.

18. The non-transitory computer readable medium of claim 1, further including instructions that cause the one or more processors to:

select a first resource manager for provisioning a resource for the first task based on the first resource type; and select a second resource manager for provisioning a resource for a second task of the first plurality of tasks based on a second resource type.

19. A computer-implemented method comprising: receiving a request for a service provided by a cloud infrastructure system;

determining, by a computer system, a process for provisioning the service, wherein the process includes performing a plurality of tasks for provisioning a plurality resources for the cloud infrastructure system to enable the service;

performing, by the computer system, the process, wherein performing the process includes invoking each of the plurality of tasks;

detecting, by the computer system, an error related to a task of the plurality of tasks;

identifying, by the computer system, an error type of the error related to the task, the error type being one of a plurality of error types;

identifying, by the computer system, a resource type of a resource for the task related to the error, wherein the resource is one of the plurality of resources;

selecting, by the computer system, an error handling process based upon an error policy of the cloud infrastructure system, wherein the error handling process is selected according to the identified error type and the identified resource type, and wherein the error handling process is configured to reinvoke the task for a threshold number of times, the threshold number of times selected from a plurality of different retry thresholds based on at least one of the error type and the resource type: and initiating, by the computer system, the selected error handling process.

20. A system comprising: one or more processors;

a memory accessible to the one or more processors and storing a plurality of instructions that, upon execution by the one or more processors, causes the one or more processors to:

receive a request for a service provided by a cloud infrastructure system;

determine a process for provisioning the service, wherein the process includes performing a plurality of tasks for provisioning a plurality resources for the cloud infrastructure system to enable the service;

perform the process, wherein performing the process includes invoking each of the plurality of tasks;

detect an error related to a first task of the plurality of tasks; identify an error type of the error related to the first task, the error type being one of a plurality of error types;

identify a resource type of a resource for the first task related to the error, wherein the resource is one of the plurality of resources;

select an error policy based upon an error policy of the cloud infrastructure system, wherein the error handling process is selected according to the identified error type and the identified resource type, and wherein the first error handling process is configured to reinvoke the first task for a threshold number of times, the threshold number of times selected from a plurality of different retry thresholds based on at least one of the first error type and the first resource type; and initiate the selected error handling process.

* * * * *

UNITED STATES PATENT AND TRADEMARK OFFICE
CERTIFICATE OF CORRECTION

PATENT NO. : 10,142,174 B2
APPLICATION NO. : 15/246352
DATED : November 27, 2018
INVENTOR(S) : Yang et al.

It is certified that error appears in the above-identified patent and that said Letters Patent is hereby corrected as shown below:

In the Specification

In Column 25, Line 37, after "customer." delete "/".

In Column 26, Line 25, delete "reinvokved." and insert -- reinvoked. --, therefor.

In the Claims

In Column 47, Line 13, in Claim 4, delete "rollback" and insert -- roll-back --, therefor.

In Column 50, Line 10, in Claim 19, delete "type:" and insert -- type; --, therefor.

Signed and Sealed this
Third Day of December, 2019

Andrei Iancu
*Director of the United States Patent and Trademark Office*